United States Patent [19]

Niide et al.

[11] Patent Number: 5,005,663

[45] Date of Patent: Apr. 9, 1991

[54] FOUR-WHEEL DRIVE VEHICLE

[75] Inventors: Kazuo Niide; Hideki Yamada, both of Hiroshima; Haruki Higashi, Hatsukaichi; Noboru Nakamura, Hiroshima, all of Japan

[73] Assignee: Mazda Motor Corporation, Hiroshima, Japan

[21] Appl. No.: 263,212

[22] Filed: Oct. 27, 1988

[30] Foreign Application Priority Data

Oct. 28, 1987 [JP] Japan .................. 62-272411

[51] Int. Cl.$^5$ .................. B60K 17/35; B60K 17/352
[52] U.S. Cl. .................. 180/247; 180/248; 180/249; 180/250
[58] Field of Search .............. 180/233, 247, 248, 249, 180/250

[56] References Cited

U.S. PATENT DOCUMENTS

| 4,690,239 | 9/1987 | Takahashi et al. | 180/249 |
| 4,729,450 | 3/1988 | Morisawa et al. | 180/249 |
| 4,744,435 | 5/1988 | Schnurer | 180/233 |
| 4,751,856 | 6/1988 | Nakamura et al. | 180/249 X |
| 4,779,698 | 10/1988 | Iwata | 180/247 |
| 4,792,012 | 12/1988 | Morisawa et al. | 180/249 X |
| 4,817,753 | 4/1989 | Hiketa | 180/249 |
| 4,867,262 | 9/1989 | Takada et al. | 180/249 |

FOREIGN PATENT DOCUMENTS

| 213958 | 3/1987 | European Pat. Off. | 180/249 |
| 137229 | 6/1987 | Japan | 180/249 |
| 137231 | 6/1987 | Japan | 180/249 |
| 112220 | 5/1988 | Japan | 180/249 |
| 170130 | 7/1988 | Japan | 180/249 |
| 173726 | 7/1988 | Japan | 180/249 |
| 114535 | 5/1989 | Japan | 180/247 |

Primary Examiner—Mitchell J. Hill
Attorney, Agent, or Firm—Fleit, Jacobson, Cohn, Price, Holman & Stern

[57] ABSTRACT

A vehicle equipped with four-wheel drive has a transfer case including a center-differential which delivers driving power to both front and rear axle assemblies when needed and is shiftable between a two-wheel and a four-wheel drive mode of operation and between a differential-locked and a differential-unlocked drive mode of operation. A free wheeling drive mechanism with a clutch member is incorporated in an output shaft of an axle differential in association with wheels non-driven in the two-wheel drive mode of operation and is adapted to disconnect when the vehicle is in the two-wheel drive mode of operation. A controller causes a forced drive mode shift of the center-differential from the four-wheel differential-underlined drive mode of operation either to the four-wheel differential-locked or to the two-wheel drive mode of operation when the disconnection of the free-wheeling drive mechanism is detected while the vehicle is in the four-wheel differential-unlocked drive mode of operation.

11 Claims, 13 Drawing Sheets

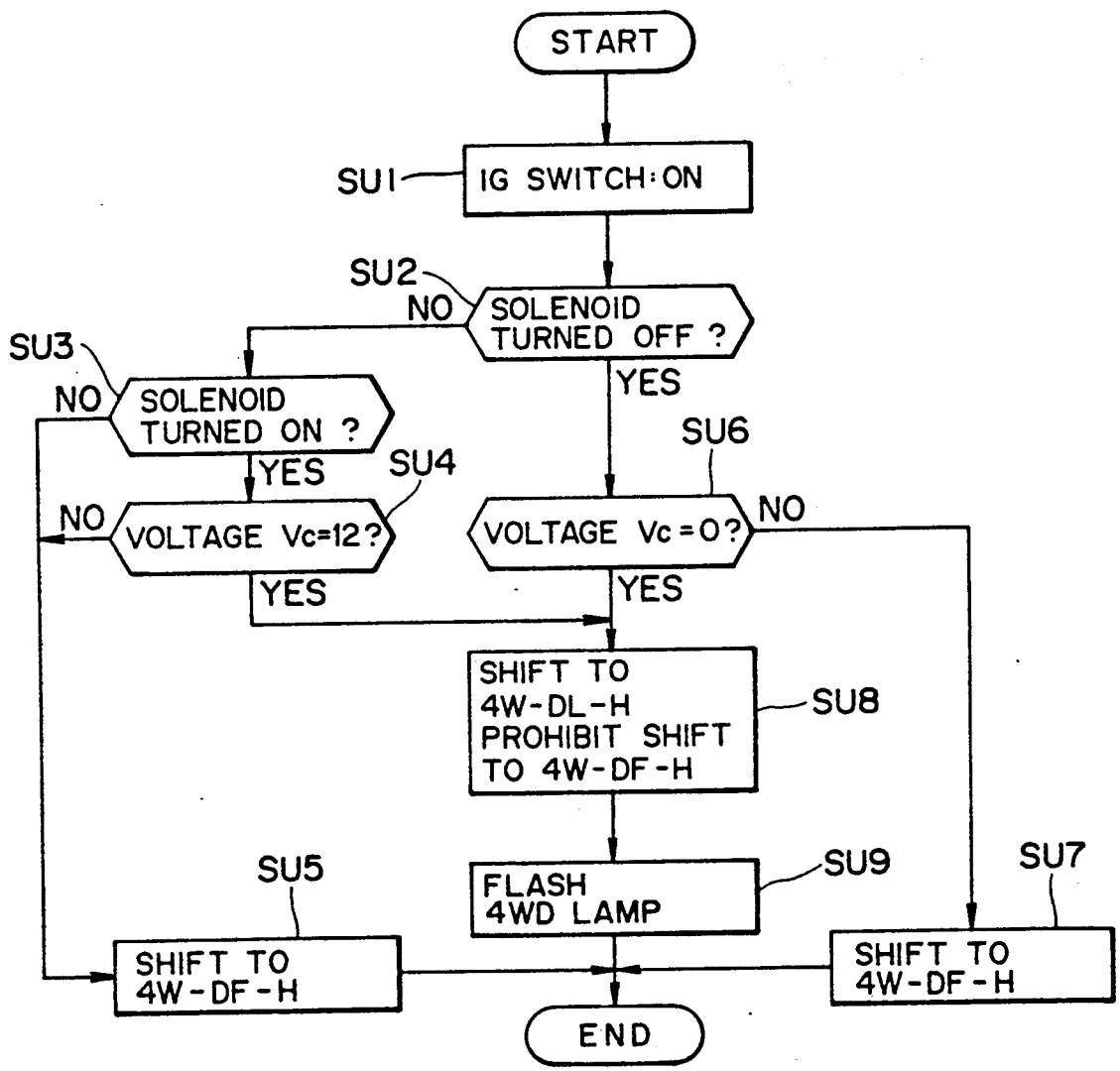

FOUR-WHEEL DRIVE VEHICLE

BACKGROUND OF THE INVENTION

The present invention relates to a vehicle equipped with part-time four-wheel drive.

In general, part-time four-wheel drive transfer cases used on vehicles deliver driving power normally only to front or rear axle assembly and, if desired, to both the front and rear axle assemblies. When the vehicle with its transfer case shifted into a two-wheel drive mode of operation is in motion, non-driven wheels, to which no driving power is transmitted when the transfer case is in the two-wheel drive mode, cause a rotational motion of gears of an axle differential case in connection with the non-driven wheels and gears of a transfer case connected to the axle differential, producing a loss of driving power.

In an attempt at avoiding such a loss of driving power caused in the part-time four-wheel transfer case, free-wheeling drive means or split axle drive means, with its incorporated clutch means, is provided in an axle shaft between one of the non-driven wheels and an axle differential associated with the non-driven wheels to split the axle shaft when the transfer case is in the two-wheel drive mode of operation so as to disconnect the transmission of motion from the non-driven wheels to the axle differential. Owing to the provision of such a free-wheeling drive means, the transfer case is independent of the motion of the non-driven wheels. One such a free-wheeling drive means is disclosed in, for example, U.S. Pat. No. 4,341,281 entitled "Split Axle Drive Mechanism" issued July 27, 1982.

Meanwhile, in part-time four-wheel vehicles equipped with a free-wheeling drive means, if the free-wheeling drive means is accidentally disconnected due to some causes such as wrong actions of an actuator of the free-wheeling drive means, breakage of a drive circuit and so on, while the vehicle is running with the center-differential in the differential-free four-wheel drive mode of operation, the transmission of driving power is disconnected from the wheels.

OBJECT OF THE INVENTION

It is, therefore, an object of the present invention to provide a part-time four-wheel drive vehicle in which the transmission of engine power to wheels is maintained even if a free-wheeling drive means is accidentally disconnected while the vehicle is running with its transfer case in a differential-free four-wheel drive mode.

SUMMARY OF THE INVENTION

In accomplishing the above and other object of the present invention in a vehicle equipped with part-time four-wheel drive having a transfer case with a center-differential, and free-wheeling drive means, when the free-wheeling drive means disconnects the transmission of drive power to a wheel in connection with the free-wheeling drive means while the center-differential is in the four-wheel differential-free drive mode of operation, it is forced to lock the center-differential so as to secure the transmission of drive power to wheels which are compulsorily driven in the two-wheel drive mode.

According to a preferred embodiment of the present invention, a vehicle equipped with part-time four-wheel drive has a transfer case with a center-differential for delivering the driving power inputted to an input shaft of the center-differential to both front and rear wheels, which transfer case is shiftable between at least a two-wheel and a four-wheel differential-free drive mode of operation; and free-wheeling drive means coupled to an output shaft of an axle differential in connection with a wheel which is non-driven in the two-wheel drive mode of operation for connecting or disconnecting the transmission of drive power between the axle differential and the non-driven wheel. There are provided in the vehicle means for detecting that the center-differential is in the differential-free drive mode, free-wheeling condition detecting means for detecting that the free-wheeling drive means is disconnected and locking means for compulsorily locking the center-differential of the transfer case to lock when the free-wheeling drive means is disconnected while the center-differential is in the differential-free drive mode.

According to the part-time four-wheel drive vehicle of the present invention, when the disconnection of the free-wheeling drive means is detected while the vehicle is cruising in the four-wheel differential-free drive mode, the center-differential is forced to shift to the differential-locked drive mode of operation. The center-differential is otherwise forced to shift to the two-wheel drive mode of operation. This forced shift of the center-differential secures the transmission of driving power to the wheels which are driven in the two-wheel drive mode.

BRIEF DESCRIPTION OF THE DRAWINGS

In the detailed description of the preferred embodiment of the present invention presented below, reference is had to the accompanying drawings, in which:

FIG. 19 is still another embodiment of a flow chart showing a mode correction subroutine of control for the controller of the part-time four-wheel drive vehicle operating system.

DETAILED DESCRIPTION OF THE INVENTION

A four-wheel drive vehicle with part-time drive feature according to a preferred embodiment of the present invention incorporates various elements, in particular an engine, a transmission, a transfer, front and rear axle assemblies and so forth, similar to those of conventional power trains. Because such elements are well known to those skilled in the art, this description will be directed in particular to elements forming part of, or cooperating directly with, the transfer case embodying the present invention. It is to be understood that transfer case elements not specifically shown or described herein may be selected from those known in the art.

Figure 1:
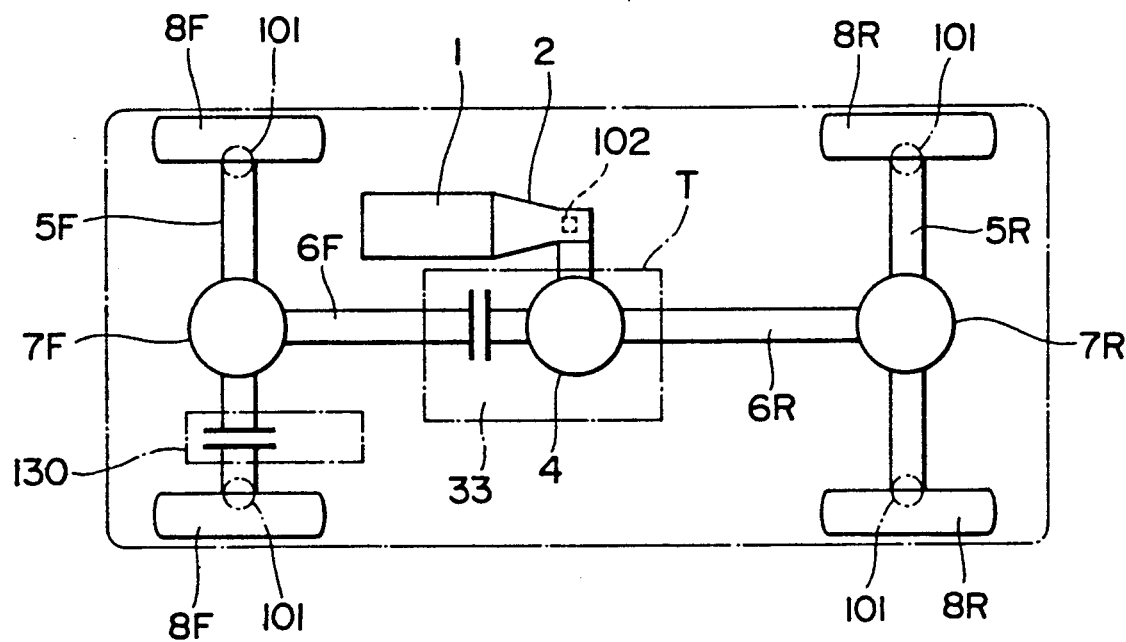
FIG. 1 is a schematic illustration showing a part-time four-wheel drive vehicle embodying the present invention.

Referring now to the drawings, wherein like reference characters designate corresponding or similar parts or elements throughout the several views, there is schematically shown in FIG. 1 a vehicle equipped with part-time four-wheel drive which has a power train as comprising an engine unit 1, a manual transmission case 2 connected to the engine unit 1 through an engine clutch (not shown), a transfer case T including a center-differential 4 and a drive mode shift mechanism 33. A rear wheel drive shaft or rear output shaft 4R of the transfer case T is coupled to a rear axle shaft 5R through a rear propeller shaft 6R and a rear axle differential gear assembly 7R by which a pair of rear wheels 8R are turned differentially. A front wheel drive shaft or front output shaft 4F of the transfer case T, which is laterally spaced from and located in parallel with the rear output shaft 4R, is coupled to a front axle shaft 5F through a front propeller shaft 6F and a front axle differential gear assembly 7F by which a pair of front wheels 8F are turn differentially. As is generally well known to those skilled in the art, each propeller shaft 6R, 6F is coupled at its both ends to the output shaft 4R, 4F and the axle differential gear cases 7R, 7F by means of universal joints. In association with the front and rear wheels 8F and 8R there is provided an anti-skid braking system which permits rapid straight line stop by preventing front and rear wheel lockup.

Figure 4:
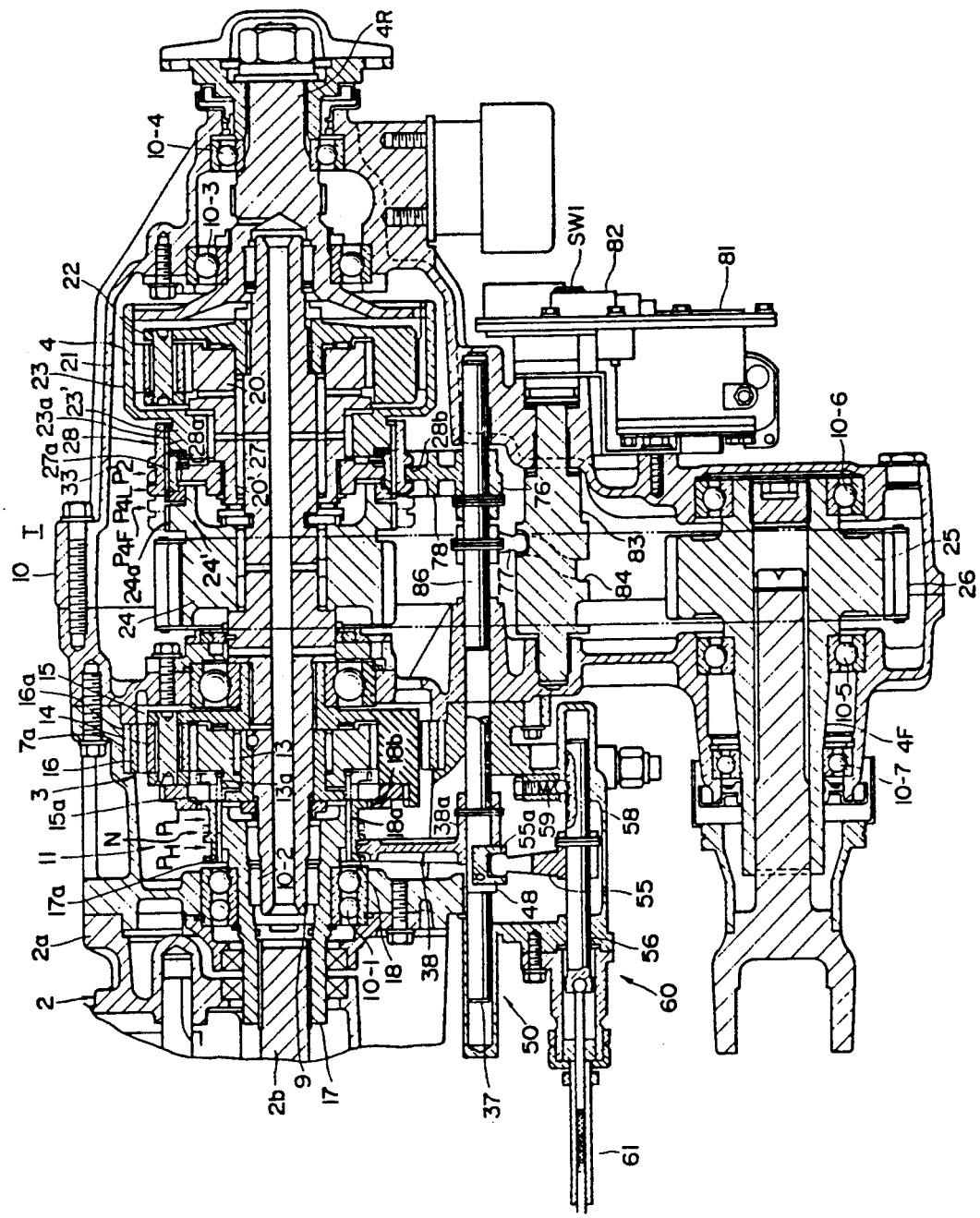
FIG. 4 is a sectional view of a transfer case used in the part-time four-wheel drive vehicle of FIG. 1.

Referring now to FIG. 4, there is shown in longitudinal section the transfer case T comprising the transfer gear assembly 3 and the center-differential gear assembly 4, each of which basically comprises a planetary gear assembly. As shown, the transfer case T has a transfer case housing 10 connected to a transmission case housing 2a of the manual transmission case 2. The transfer case T has three rotatable shafts, namely a transfer input shaft 9 located coaxially relative to an output shaft 2b of the manual transmission case 2 held in the transfer case housing 10 for rotation; the rear output shaft 4R located coaxially relative to the transfer input shaft 9 and held by ball bearings 10-3 and 10-4 in the transfer case housing 10 for rotation; and the front output shaft 4F laterally spaced from and located in parallel with both the transfer input shaft 9 and the rear output shaft 4R and held by ball bearings 10-5, 10-6 and 10-7 in the transfer case housing 10 for rotation. The transfer gear assembly 3 and the center-differential gear assembly 4 which will be described in detail later are mounted on the transfer input shaft 9.

Arranged coaxially with the transfer gear and the center-differential gear assemblies 3 and 4 are two shift mechanisms; namely a transfer gear shift means 11 in cooperation with the transfer gear assembly 3 disposed on the front or left side of the transfer gear assembly 3 and a differential gear shift means 33 in cooperation with the center-differential gear assembly 4 on the front or left side of the center-differential gear assembly 4.

The transfer gear assembly 3 which is selectively shiftable into a desired drive range, namely a low speed drive range or a high speed drive range (which are hereinafter noted by L or H drive mode on descriptive listings), to transmit driving power with or without torque multiplicatior from the manual transmission case 2 to the center-differential gear 4, consists of a planetary gear assembly. This planetary gear assembly has a sun gear 13 mounted on the transfer input shaft 9 for rotation; a plurality of pinion gears 14 meshed with the sun gear 13 and supported by a carrier member 15 spline-coupled to the transfer input shaft 9; and a ring gear 16 in mesh with the pinion gears 14. The ring gear 16 is provided with external threads 16a which are in mesh with internal threads 7a formed on inner surface of the transfer case housing 10 so as to be fixedly held in the transfer case housing 10.

The sun gear 13 is formed with external splines 13a on its front outer perphery and the carrier 15 has an internal splines 15a formed on its front inner surface. A sleeve shift 17 spline-coupled to the output shaft 2b of the transmission case 2 is supported by the transfer housing 10 through ball bearing 10-1 for rotation and rotatably receives therein the front end of the transfer input shaft 9 through a needle bearing 10-2. The sleeve shaft 17 is formed on its rear peripheral surface with external splines 17a coaxial with the splines 13a of the sun gear 13. Spline-coupled to the sleeve shaft 17 is a shift member 18 in the form of a sleeve which is formed with internal splines 18a engageable with the splines 13a of the sun gear 13 and with external splines 18b engageable with internal splines 15a of the carrier member 15. The shift sleeve member 18 is axially displaced along the splines 17a of the sleeve shaft 17 to shift the transfer gear assembly 3 to a desired speed range; H or L drive mode. When the shift sleeve member 18 is placed at a high speed range selecting position ($P_H$) as is shown in FIG. 4, the shift sleeve member 18 is brought into mesh with the carrier member 15, coupling the output shaft 2b of the transmission case 2 to the input shaft 9 of the transfer gear assembly 3 to directly transmit driving power therebetween without torque multiplication or gear ratio reduction. On the other hand, when the shift sleeve member 18 is placed at a low speed range selecting position ($P_L$) as is shown by a phantom line in FIG. 4, the shift sleeve member 18 is disengaged from the carrier member 15 and is brought into mesh with the sun gear 13 through the spline 13a, coupling the output shaft 2b of the transmission case 2 to the input shaft 9 of the transfer gear assembly 3 through the sun gear 13, the pinion gears 14 and the carrier member 15 so as to transmit driving power therebetween with torque multiplication or gear ratio reduction. The shift sleeve member 18 can be placed in a neutral or idle position (N) between the positions $P_H$ and $P_L$ to maintain the transfer gear assembly 3 in an idle condition.

Coaxially with and spaced apart from the transfer gear assembly 3, there is a center-differential gear assembly 4 mounted on the transfer input shaft 9 of the transfer case T. This center-differential gear assembly 4 comprises a planetary gear assembly having a sun gear 20 mounted on the transfer input shaft 9 for rotation, a carrier member 22 which is spline-coupled to the transfer input shaft 9 and carries a plurality of pinion gears 21, and a ring gear 23 fixedly coupled to the rear output shaft 4R.

Rotatably mounted on the transfer input shaft 9 between the transfer gear assembly 3 and the center-differential gear assembly 4 is a driving sprocket wheel 24 which is connected to a driven sprocket wheel 25 formed integrally with the front output shaft 4F by means of a driving chain 26 ( shown by dotted line in FIG. 4 ). Through these driving and driven sprocket wheels 24 and 25, driving power is transmitted from the transfer input shaft 9 of the transfer case T to the front output shaft 4F.

The sun gear 20 and the ring gear 23 of the planetary gear assembly of the center-differential gear assembly 4 have front extensions 20' and 23' formed integrally therewith, respectively. Spline-coupled to the front extension 20' of the sun gear 20 is a clutch hub 27 formed with external splines 27a. On the other hand, rotatably mounted on the front extension 20' of the sun gear 20 is the front extension 23' of the ring gear 23 which is formed with external splines 23a coaxial with the splines 27a of the clutch hub 27. The driving sprocket wheel 24 has a rear extension 24' having external splines 24a coaxial with the external splines 27a of the clutch hub 27. Slidably spline-coupled to these external splines 23a, 24a and 27a of the ring gear 23, the driving sprocket wheel 24 and the clutch hub 27 is a shift member 28 in the form of a sleeve through its internal spline 28a. By these elements, namely the shift sleeve member 28, the rear extension 24' of the driving sprocket wheel 24, the clutch hub 27 and the front extension 23' of the ring gear 23, center-differential gear shift means 33 is formed.

The shift sleeve member 28 can be selectively placed in three positions to shift the center-differential gear assembly 4 between a 4-wheel differential-free or differential-unlocked drive mode, a 4-wheel differential-locked drive mode and a 2-wheel drive mode (which are hereinafter noted by 4W-DF, 4W-DL, and 2W drive modes, respectively on descriptive listings ). More specifically, when the shift sleeve member 28 is placed in a position $P_{4F}$ shown by a phantom line in FIG. 4 to select the 4W-DF drive mode, the shift sleeve member 28 couples or locks together the clutch hub 27 and the driving sprocket wheel 24 through their splines 24a, 27a and 28a and, simultaneously, uncouples the sun gear 20 and the ring gear 23 of the planetary gear assembly of the center-differential gear assembly 4, thereby to shift the center-differential gear assembly 4 into the 4W-DF drive mode. When the shift sleeve member 28 is placed in a position $P_{4L}$ shown by a solid line in FIG. 4 to select the 4W-DL drive mode, the shift sleeve member 28 couples the driving sprocket wheel 24 and the clutch hub 27 as well as the sun gear 20 and the ring gear 23 of the planetary gear assembly of the center-differential gear assembly 4 all together, thereby to shift the center-differential gear assembly 4 into the 4W-DL drive mode. Finally, when the shift sleeve member 28 is placed in a position $P_2$ shown by a phantom line in FIG. 4 to select the 2W drive mode, the shift sleeve member 28 couples the sun gear 20 and the ring gear 23 of the planetary gear assembly of the center-differential gear assembly 4, simultaneously with uncoupling the clutch hub 27 from the driving chain sprocket wheel 24, thereby to shift the center-differential gear assembly 4 into the 2W drive mode.

Arranged in juxtaposition with the transfer input shaft 9 of the transfer case T are shift means 50 for causing mechanically the transfer gear shift means 11 to selectively shift the transfer gear assembly 3 between two different drive ranges, namely, the low speed drive range (L drive mode) and the high speed drive range (H drive mode) and transfer case shift control means 60 for electrically actuating differential gear shift means 33 to selectively shift the center-differential gear assembly 4 between the 2W and 4W drive modes and/or the DF and DL drive modes.

The shift means, 50 includes a shift rod 37 spaced laterally from and in parallel with the input shaft 8 of the transfer case T which is slidably supported by the transfer case housing 10 for axial movement but is prevented from rotation. The shift rod 37 is selectively placed in four different drive mode selecting positions and idle selecting position corresponding to the respective drive modes into which the transfer case T is shiftable. These modes are hereinafter noted by 2W-H (2-wheel, high-speed range) d rive m ode, 4W - DF-H (4-wheel, differential-free, high-speed range) drive mode, 4W-DL-H (4-wheel differential-locked, high-speed range) drive mode and 4W-DL-L (4-wheel differential-locked, low-speed range) drive mode, in order from the front or the left as viewed in FIG. 4, and an idle mode between the 4W-DL-H and 4W-DL-L drive modes, respectively on descriptive listings.

Slidably mounted on the shift rod 37 is a boss 38a of a shift fork 38 slidably received by an annular groove 18c of the shift sleeve member 18 of the transfer gear shift means 11. Fastened to the shift rod 37 is an annular connecting ring 48 disposed on the front side of the boss 38a of the shift fork 38. The boss 38a of the shift fork 38 abuts against a restriction stud (not shown) projecting from the transfer case housing 10 when the shift rod 37 is axially displaced beyond the 4W-DL-H drive mode selecting position from right to left as viewed in FIG. 4, so that the boss 38a of the shift fork 38 is restricted to axially slide to left while allowing the shift rod 37 to be displaced further to left. When the boss 38a of the shift fork 38 is restricted by the restriction stud, the shift fork 38 is so positioned as to place the shift sleeve member 18 of the transfer gear shift means 11 in the position $P_H$ where the transfer gear assembly 3 is shifted into the high speed drive range, or the H drive mode. Although the shift fork 38 is prevented from being displaced beyond the position $P_H$, the shift rod 37 can be displaced in the forward direction beyond the 4W-DL-H drive mode selecting position to the 2W-H drive mode selecting position. When the shift rod 37 is urged in the forward direction, it is allowed to axially move, leaving the shift fork 38 at the position $P_H$. On the other hand, when the shift rod 37 is axially displaced in the rearward direction beyond the 4W-DL-H drive mode selecting position, the shift fork 38 is pushed by the annular connecting ring 48 to the right so as to displace the shift sleeve member 18 of the transfer gear shift means 11 to the the position $P_L$ from the position $P_H$. As a result of this displacement of the shift sleeve member 18, the transfer gear assembly 3 is shifted into the low speed drive range, or the L drive mode. For positively placing the shift fork 38 in the position $P_H$ or $P_L$, it is preferred to provide a click stop mechanism which may be of any well known construction.

For effecting the above-described drive mode shifting of the transfer case T, there is the transfer case shift control means 60. Although the transfer case shift control means 60 is practically arranged in a plane perpendicularly intersecting the drawing and side by side with respect to the shift means 50, it is, in FIG. 4, turned through a right angle and is illustrated below the shift means 50 for easy understanding. There is a shift control rod 56 disposed in juxtaposition with the shift rod 37 and supported by the transfer case housing 10 for axial movement to left and right. The shift control rod 56 is provided with a connecting arm 55 fixed thereto. The rounded top end 55a of the connecting arm 55 is received in an peripheral recess of a connecting member which is fixed to the annular connecting ring 48 fixedly mounted on the shift rod 37 of the shift means 50. In the outer periphery of the rear end portion of the shift control rod 56, there are formed five substantially semispherical recesses axially arranged at regular intervals. Facing to these recesses there is provided in the transfer case housing 10 a click stop mechanism which may be of any well known construction in order to certainly position the control rod 56 at five different drive mode selecting positions including the idle mode selecting position.

For shifting the transfer case T, in particular the center-differential gear assembly 4 between 2W and 4W drive modes and/or DF and DL drive modes through the center-differential gear shift means 33, a controller 100 (shown in FIG. 2) is used to control a drive motor 81 with its associated reduction gear 82 which is operationally coupled to a shift control rod 83 supported by the transfer case housing 10 for rotation and having a cam groove 84. Disposed in juxtaposition with the shift control rod 83 is a guide rod 86 to which a sleeve member 76 is fixedly mounted. The sleeve member 76 is provided with a connecting pin 77 by which the cam groove 84 of the shift control rod 83 is slidably engaged and with a shift fork 78, the connecting pin 77 and shift fork 78 being axially spaced from and extending radially oppositely to each other. The shift fork 78 is in slidable engagement with an annular groove 28b formed on the outer periphery of the shift sleeve member 28 of the differential gear shift means 33.

Figure 5:
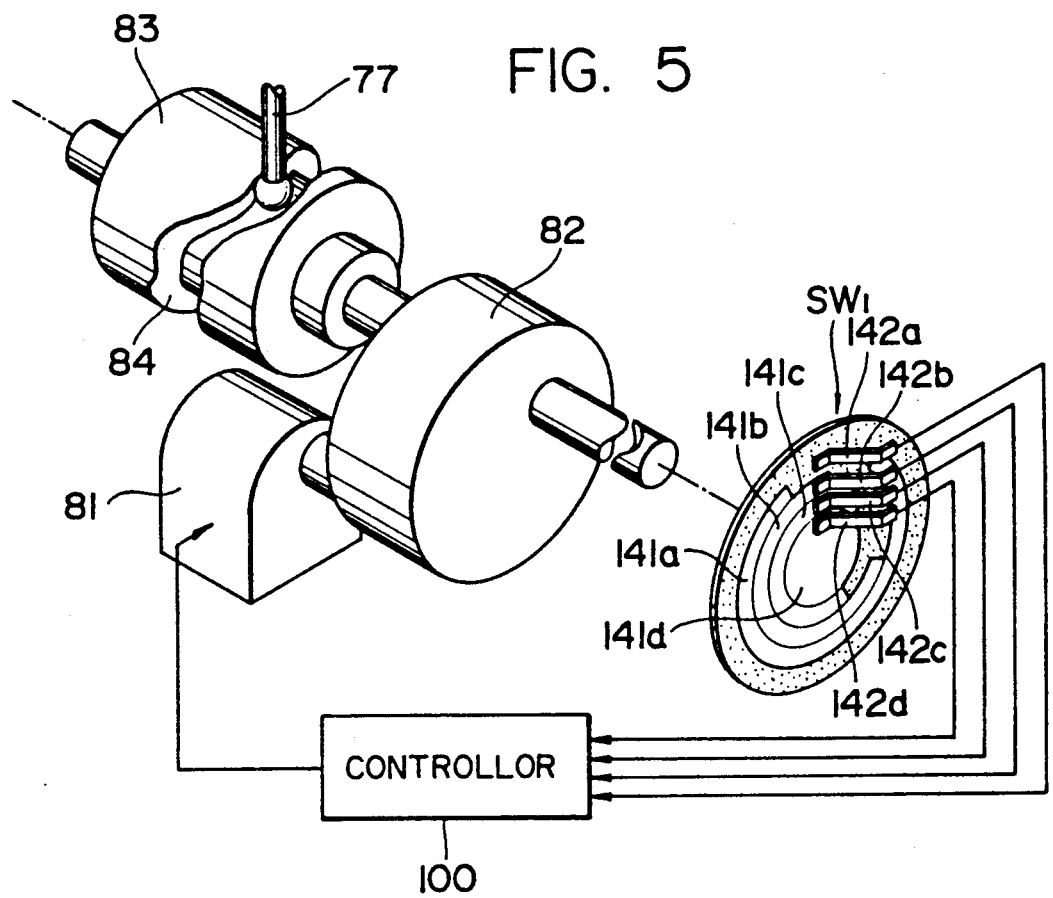
FIG. 5 is an exploded perspective view of a mode sensor.
Figure 6:
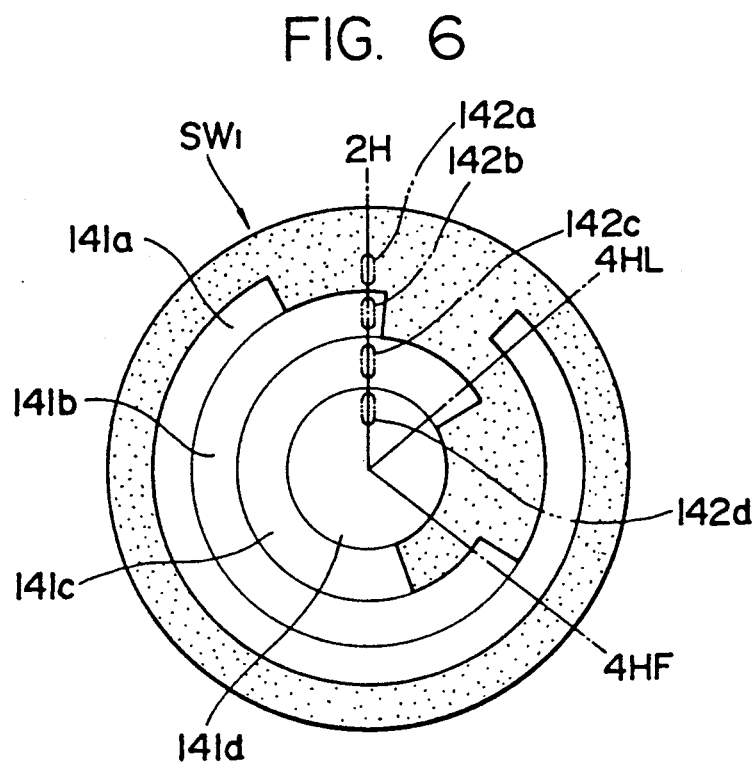
FIG. 6 is a plan view of a printed contact disk of the mode sensor of FIG. 5.

The shift control rod 83 is associated with a mode sensor SW1 which detects the shifted drive modes of the center-differential based on angular positions of the shift control rod 83 to provide a mode signal which in turn is sent to the controller 100. As is shown in FIGS. 5 and 6, the mode sensor SW1 comprises arcuate contacts 141a to 141d printed on a disk fixed to the a shaft of the shift control rod 83 and fixed contacts 142a to 142d provided one individual to each printed contact to provide an appropriate mode signal according to a shifted drive mode. The contacts 141d and 142d are used as common contacts to the other three. When the drive motor 81 is rotated to turn the shift control rod 83 through an angle sufficient to axially displace the guide rod 86 so as to place the shift sleeve member 28 of the differential gear shift means 33 to the position $P_2$ in order to shift the center-differential gear assembly to the 2W drive mode of operation, the printed contact 141c is brought into contact with the fixed contact 142c to provide a 2W mode signal upon the presence of the mode signal, the controller 100 stops the motor 81. In the same manner, the mode detector SW1 provides a 4W-DL mode signal through the contacts 141b and 142b brought into contact with each other when the center-differential gear assembly is shifted to the 4W-DL drive mode of operation or a 4W-DF mode signal through the contacts 141a and 142a brought into contact with each other when the center-differential gear assembly is shifted to the 4W-DF drive mode of operation. These mode signals are sent to the controller 100 to stop the motor 81.

Figure 3:
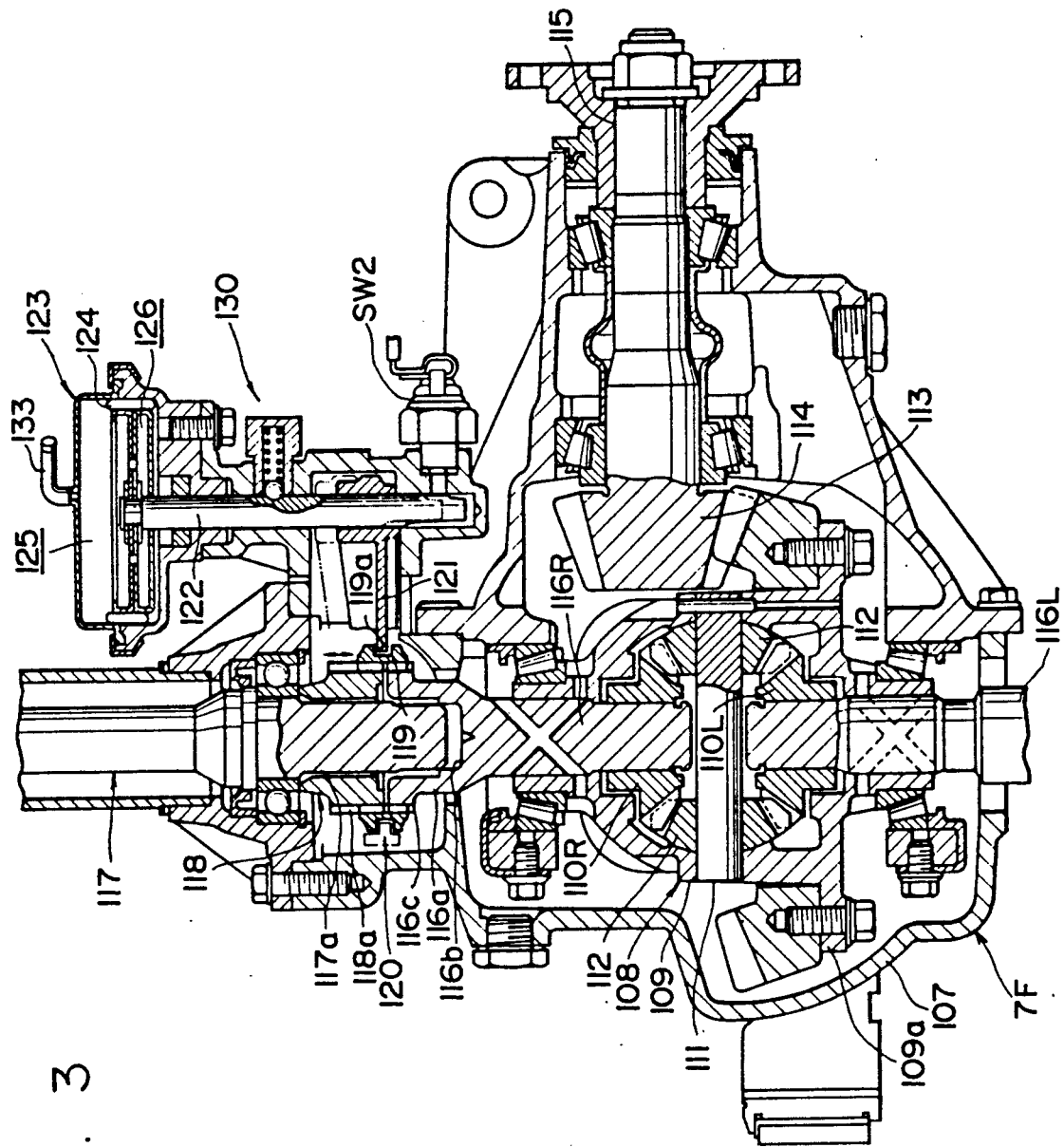
FIG. 3 is a sectional view showing details of an axle differential with a free-wheeling drive means provided in a front axle shaft.

Referring now to FIG. 3, there is shown details of the front axle differential case 7F. AS shown, the front axle differential case 7F has a front differential housing 107 in which a front axle differential gear assembly 108 is supported for rotation. This front axle differential gear assembly 108 comprises a differential carrier 109 supported by and within the front axle differential housing 107 for rotation; left and right side half axle shafts 116L and 116R forming parts of the front axle shaft 5F; a pair of differential side gears 110L and 110R splined to the inner end of the left and right side half shafts 116L and 116R, respectively; and a pair of differential pinions 112 which are fixedly mounted on a pinion shaft 111 supported by and disposed within the differential carrier 109 and are in mesh with the differential side gears 110L and 110R. Bolted to an annular flange 109a of the differential carrier 109 is a ring gear 113 in the form of a bevel gear which is in mesh with a driving pinion gear 114 formed integrally with an input shaft 115 coupled to the front output shaft 7F of the transfer case T through the front propeller shaft 6F.

Coaxially disposed on the right side of the front axle differential case 7F is axial splitting means 120 of the front free-wheeling drive means 130. Coaxially disposed adjacent to the right side half axle shaft 116R which is one of the output shaft of the front axle differential case 7F is a joint axle 117 coupling together right side half axle 116R and the right side front wheel 8F. The joint axle 117 has its inner spindle section 117a having a diameter smaller than that of the major portion thereof and, on the other hand, the right side half axle 116R has its outer enlarged section 116a formed with a bore 116b which receives and supports therein the inner spindle section 117a of the joint axle 117 for rotation.

On the outer periphery of the enlarged section 116a of the right side half axle 116, there are formed with splines 116c. To the inner spindle section 117a of the joint axle 117, an annular ring 118 formed with external splines 118a is splined. A shift sleeve clutch 119 is provided to lock together and unlock the right side half axle 116R and the joint axle 117 through a spline coupling. When the shift sleeve clutch 119 locks together these axle 116R and 117, the front axle differential case 7F is directly connected to the right side front wheel 8F to transmit driving power to the same. However, if the shift sleeve clutch 119 is displaced to unlock or split the right side half axle 116R and the joint axle 117, no driving power is transmitted between the front axle differential case 7F and the right side front wheel 8F.

The shift sleeve clutch 119 is formed with an external annular recess 119 for receiving a shift fork 121 fixed to a shift control rod 122. At one end of the shift control rod 122, there is diaphragm means 123 functioning as an actuator for the shift control rod 122. This diaphragm means 123 comprises a diaphragm member 124 connected to the out end of the shift control rod 122, first and second pressure chambers 125 and 126 divided by the diaphragm member 124 in a housing.

Figure 2:
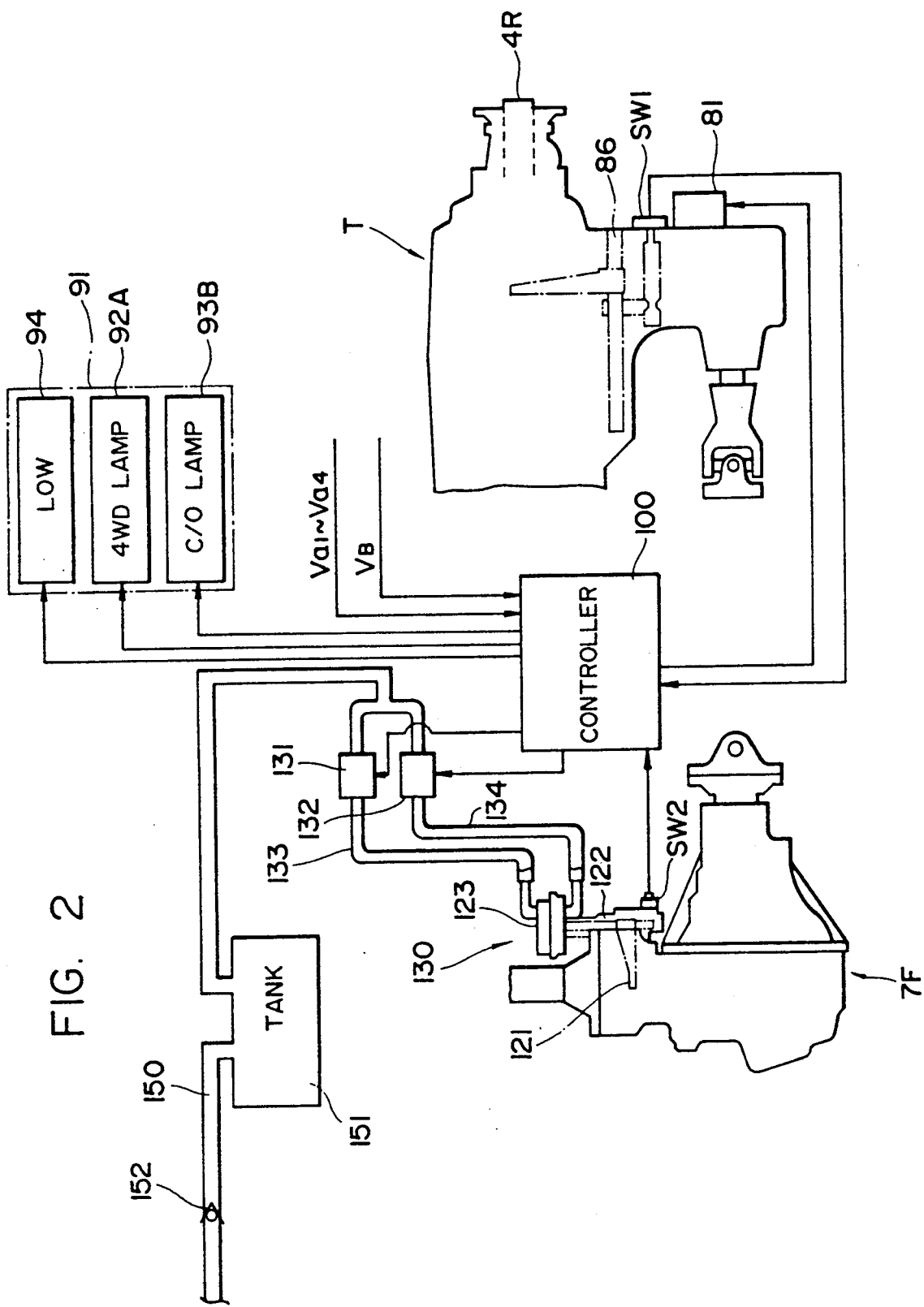
FIG. 2 is a fragmentary diagram, partly in block diagram, showing the part-time four-wheel drive vehicle operating system.

As is shown in FIG. 2, the first and second pressure chambers 125 and 126 of the diaphragm means 123 are in communication with an intake pipe 150 of the engine unit 1 through pipes 133 and 134 and a negative pressure reservoir tank 151 with a one-way valve 152, so as to introduce negative pressure thereinto. In the pipes 133 and 134, there are normally closed first and second solenoid valves 131 and 132, respectively, to control the axle splitting means 120. In more detail, when the first solenoid valve 131 is opened, the pressure within the first pressure chamber 125 becomes low relative to the pressure in the second pressure chamber 126 so as to deflect the diaphragm member 124 toward the first pressure chamber 125, thereby to displace the shift control rod 122 axially to the right. As a result, the shift sleeve clutch 119 is displaced to the right from the position shown in FIG. 3 so as to unlock the right side half axle 116R of the front axle differential case 7F from the joint axle 117 connected to the right side front wheel 8F. When these axles 116R and 117 are unlocked, no motion of the front wheel 8F is transmitted to the differential side gears 110R and the differential pinion gears 112 of the front axle differential case 7F, thereby no differential motion is caused between the front wheels 8F and the transfer case T is not affected by the motion of the front wheels 8F. The shift control rod moved to right and left is detected by means of a free-wheeling sensor SW2 such as a limit switch to provide an unlock signal indicating that the axle splitting means 120 is completely unlocked. It is noted that the absence of the unlock signal is a signal indicating that the axial splitting means 120 is locked.

On the other hand, when the second solenoid valve 130 is opened, the pressure chamber 126 becomes negative with respect to the first pressure chamber 125 so as to deflect the diaphragm member 124 toward the second pressure chamber 126, thereby to displace the shift control rod 122 to the left as shown in FIG. 3. As a result, the shift sleeve clutch 119 is displaced in the opposite side and returns to the position shown in FIG. 3 so as to lock together the right side half axle shaft 116R and the joint axle 117. Through the right side half axle shaft 116R and the joint axle 117 locked together, an ordinary differential motion is caused between the front wheels 8F. The shift control rod 122 moved to the left is detected by means of the free-wheeling sensor SW2 which provides no unlock signal when the axle splitting means 120 is completely locked.

Figure 7A:
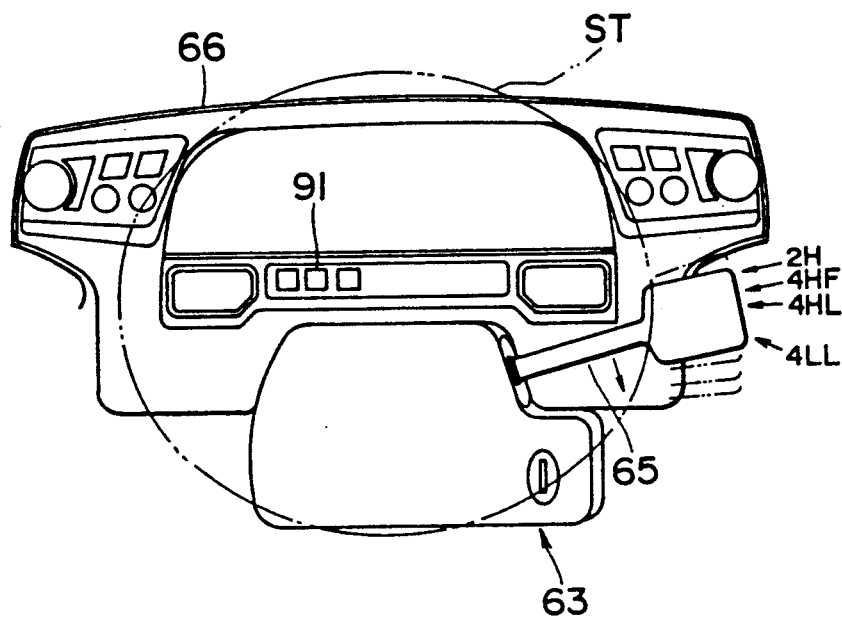
FIG. 7A to 7C are illustrations showing drive mode selecting means used in association with the part-time four-wheel drive vehicle operating system of FIG. 2.
Figure 7B:
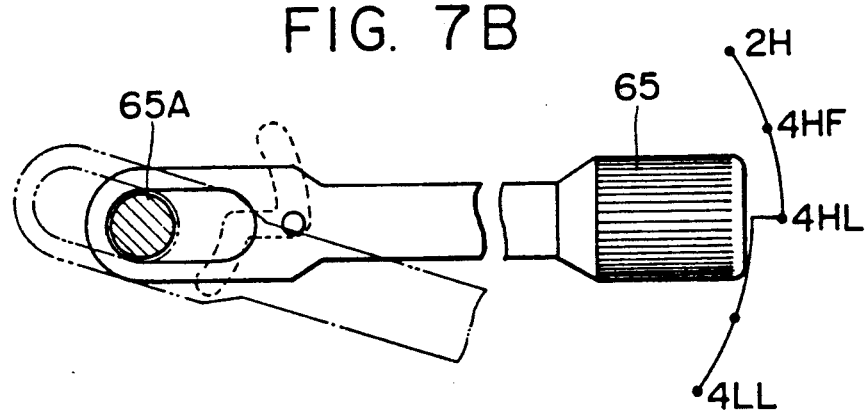

For actually effecting the above-described drive mode shifting of the transfer case T, there is drive mode selecting means with a drive mode selecting lever such as a column shift lever operated by the driver in the driver's compartment. As shown in FIGS. 7A and 7B, the drive mode selecting means 63 includes the drive mode selecting lever 65 movable up and down and mounted on a steering column 65A mounting a steering wheel ST. The drive mode selecting lever 65 is shiftable between four selecting positions, namely in order from the top, 2W-H drive mode, 4W-DF-H drive mode, 4W-DL-H drive mode, and 4W-DL-L drive mode selecting positions, to select a desired drive mode of operation of the transfer case T. It is noted in this embodiment that, when the drive mode selecting lever 65 is shifted between the 4W-DL-H drive mode and 4W-DL-L drive mode selecting positions, the drive mode selecting lever 65 is radially pushed or pulled as is shown in FIG. 7B. Corresponding to the operation of the drive mode selecting lever 65, the shift control rod 56 of the transfer case shift control means 60 is selectively positioned in the drive mode selecting positions through the push-pull type cable 61. When the drive mode selecting lever 65 is manipulated, the controller 100 causes the motor 81 to shift the transfer case T, in particular the center-differential gear assembly 4. As a result of transition of the center-differential gear assembly 4 to a drive mode selected by the drive mode selecting lever 65, the controller 100 receives a mode signal from the mode sensor SW1 so as to stop the motor 81.

Figure 7C:
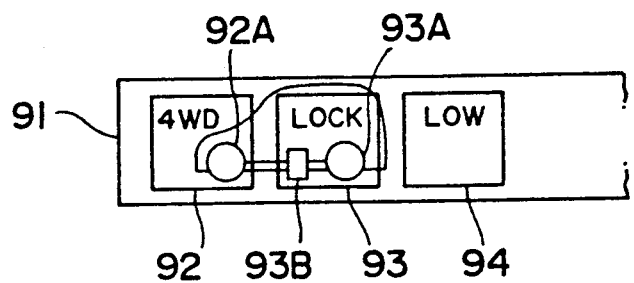

In FIGS. 2 and 7C, connected to the controller 100 is a drive mode display 91 installed in an instrument panel 66 shown in FIG. 7A. This drive mode display 91, which lights up and flashes to indicate drive modes, includes a four-wheel drive mode indicator or lamp (4WD) 92, a center-differential-locked drive mode indicator or lamp (Lock) 93, and a low range drive mode indicator or lamp (Low) 94 arranged in order from the left in FIG. 7C. Illustrated over the indicators 92 and 93 in FIG. 7C is a picture of vehicle. A front wheel of the picture of vehicle depicted on the 4WD indicator 92 is illuminated by a lamp (4WD lamp) 92A and a rear wheel of the picture of vehicle is depicted and painted in the form of a circle 93B on the Lock indicator 93. Between the front and rear wheels of the picture of vehicle there is a lamp (CD lamp) 93B which is turned on when the center-differential is locked. The 4WD lamp 92A is turned on in the a 4W drive mode and turned off in the 2W drive mode. The C/D lamp 93B is turned on in the center-differential-locked drive mode and turned off in the center-differential-free drive mode.

Although there not shown in FIG. 7A, there are provided a turn signal lever and a turning switch which is turned on when the turn signal lever is operated. There is further provided in association with the steering wheel a steering wheel switch which is turned on when the steering wheel is operated through an angle larger than a predetermined constant angle. When each of these switches is turned on, an appropriate signal is sent to the controller 100.

In operation of the operating apparatus of the preferred embodiment according to the present invention constructed as described above, the drive mode selecting lever 65 is manipulated by the driver in the driver's compartment to select a desired drive mode of the transfer case T. All the elements of the transfer case T are positioned shown in FIGS. 3 and 4 when the transfer case T is in the 4W-DL-H drive mode.

When the drive mode selecting lever 65 is manually operated and moved up to the 2W-H drive mode selecting position (2H) from the 4W-DL-H drive mode selecting position (4HL), the control rod 56 is, displaced axially in a direction to the front or left side as viewed in FIG. 4 to force the shift rod 37 to move axially in the same direction. The boss 38a of the shift fork 38 is prevented from moving axially in the forward direction, no shifting operation is caused in the transfer gear shift means 11 so as to maintain the transfer gear assembly 3 in the high speed drive range, namely the H drive mode. The controller 100 causes the electric motor 81 to rotate so as to turn the shift control rod 83 through the reduction gear 82 until the mode sensor SW1 provides a mode signal. As a result, the guide rod 86 is axially displaced to the rear or right side as viewed in FIG. 4 through the sliding engagement between the can groove 84 of the control rod 83 and the connecting pin 77 of the guide rod 86 to place the shift sleeve member 28 of the differential gear shift means 33 is the position $P_2$. As was previously described, when the shift control rod 83 turns through an angle necessary to place the shift sleeve member 28 in the position $P_2$, the mode sensor SW1 provides the controller 100 with an mode signal. By the presence of the mode signal, the controller 100 stops the motor 81. In such a way, the center-differential gear assembly 4 is shifted in the 2W drive mode from the 4W-DL drive mode while, the transfer gear assembly 3 is maintained in the H drive mode, namely, the transfer case T is shifted in the 2W-H drive mode.

When the drive mode selecting lever 65 is moved up to select the 4W-DF-H drive mode, the control rod 56 is axially displaced to the 4W-DF-H drive mode selecting position, forcing the shift rod 37 to move axially to the 4W-DF-H drive mode selecting position. Although the shift rod 37 is axially displaced in any direction toward the selecting position, the boss 38a of the shift fork 38 of the transfer gear shifting means 11 stays at the same position without shifting the shift sleeve member 18 from the position $P_H$ to either the position N or the position $P_L$, the transfer gear assembly 3 is maintained in the H drive mode. On the other hand, when the control rod 56 is axially displaced and placed in the 4W-DF-H drive mode selecting position, the controller 100 causes the motor 81 to rotate so as to turn the shift control rod 83 through the reduction gear 82, axially displacing the guide rod 86 through the sliding engagement between the cam groove 84 and the connecting pin 77 to move the shift sleeve member 28 of the differential shift means 33 toward the position $P_{4F}$. When the shift control rod 83 turns through an angle necessary to place the shift sleeve member 28 in the position $P_{4F}$, the mode sensor SW1 provides the controller 100 with a mode signal so as to stop the electric motor 81. In such a way, the center-differential gear assembly 4 is shifted in the 4W-DF drive mode while the transfer gear assembly 3 is maintained in the H drive mode, so as to shift the transfer case T in the 4W-DF-H drive mode.

As is apparent from the above description, when the drive mode selecting lever 65 is manually manipulated by the driver between the three selecting positions, namely the 2W-H, 4W-DF-H and 4W-DL-H drive mode selecting positions, the transfer gear shift means 11 is never actuated, so that the transfer gear assembly 3 is maintained in the H drive mode by means of the skid shifting mechanism 50 while the shift rod 37 is axially displaced to cause the motor 81 to turn in order to shift the center-differential gear assembly 4.

On the other hand, when it is desired to shift the transfer case T into the 4W-DL-L drive mode, the drive mode selecting lever 65 is pushed radially inwardly and then pulled downward to select the 4W-DL-L drive mode. This manipulation of the drive mode selecting lever 65 causes the axial movement of the control rod 56 to the rear or right side as viewed in FIG. 4 toward the 4W-DL-L drive mode selecting position thereof. Through the engagement of the connecting sleeve 48 of the shift rod 37 and the connecting pin 55 of the shift control rod 56, the shift rod 37 is axially displaced in the same direction as the control rod 56. Because of the connecting sleeve 48 fixed to the shift rod 37, the shift fork 38 is forced by the connecting sleeve 48 to move axially to the right side, shifting the shift sleeve member 18 of the transfer gear shift means 11 to the position $P_L$ so as to shift the transfer gear assembly 3 into the L drive mode. The controller 100 causes the electric motor 81 to rotate so as to turn the shift control rod 83, axially displacing the guide rod 86 through the sliding engagement between the cam groove 84 of the shift control rod 83 and the connecting pin 77 of the guide rod 86. As a result, the shift sleeve member 28 engaged by the shift fork 78 is displaced toward the position $P_{4L}$. At the moment the shift sleeve member 28 is placed in position, the mode sensor SW1 provides the controller 100 with the mode signal. Responding to the provision of the mode signal, the controller 100 stops the motor 81 to complete the transition of the center-differential gear assembly 4 to the 4W-DL drive mode, and hence the transition of the transfer case T to the 4W-DL-L drive mode.

As is apparent from the above description, when the transfer gear assembly 3 is shifted between the high and low speed drive mode H and L, the transfer gear shift means 11 is mechanically connected to the drive mode selecting lever 65 through the cable 61, the shift control rod 56 and the shift rod 37 with the skid shift means 50 and operated directly by the driver. Owing to this mechanical and direct operation, the transition of the transfer gear gear assembly 3 is taken certainly and smoothly even though a large force is required to shift the transfer gear shift means 11. The operation of the four-wheel drive vehicle depicted in FIGS. 1 through 7 is best understood reviewing FIGS. 8 to 16, which are flow charts illustrating various routines and subroutines for the controller 100 mainly comprising a microcomputer. Programming a computer is a skill well understood in the art. The following description is written to enable a programmer having ordinary skill in the art to prepare an appropriate program for the microcomputer. The particular details of any such program would of course depend upon the architecture of the particular microcomputer selected.

Figure 8:
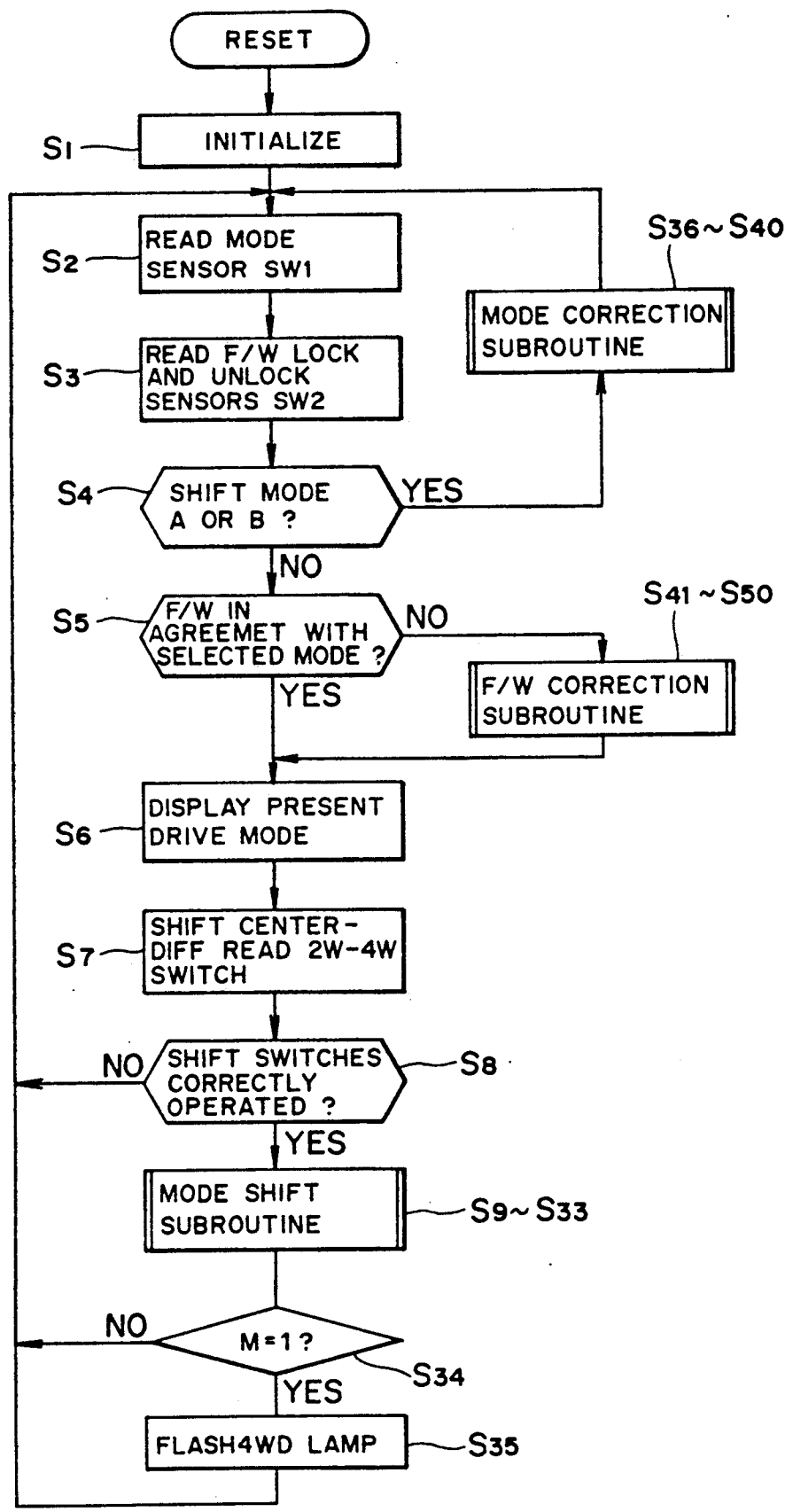
FIG. 8 is a flow chart showing a main routine of control for a controller of the part-time four-wheel drive vehicle operating system.

Referring now to FIG. 8, which is a flow chart illustrating a main routine for the microcomputer of the controller 100, the first step S1 is to initialize the microcomputer. Following the initialization, the next step is to read the condition of the drive mode sensor SW1 in second step S2 and to read the conditions of the free-wheeling sensor SW2 in step S3. In step S4, based on the condition of the drive mode sensor SW1, a first decision is made to determine whether the transfer case T is in a shift mode A (in which the transfer case T for being shifted between the 2W-H drive mode and 4W-DL-H drive mode) or in a shift mode B (in which the transfer case is ready for being shifted between the 4W-DL-H and 4W-DF-H drive modes). In other words, a decision regarding whether the transfer case T has been ready for any shift other than a shift between the H and L drive modes. If the answer is yes, indicating the transfer case T is in the shift mode A or B, a mode correction subroutine shown in FIG. 9 is called for.

Figure 9:
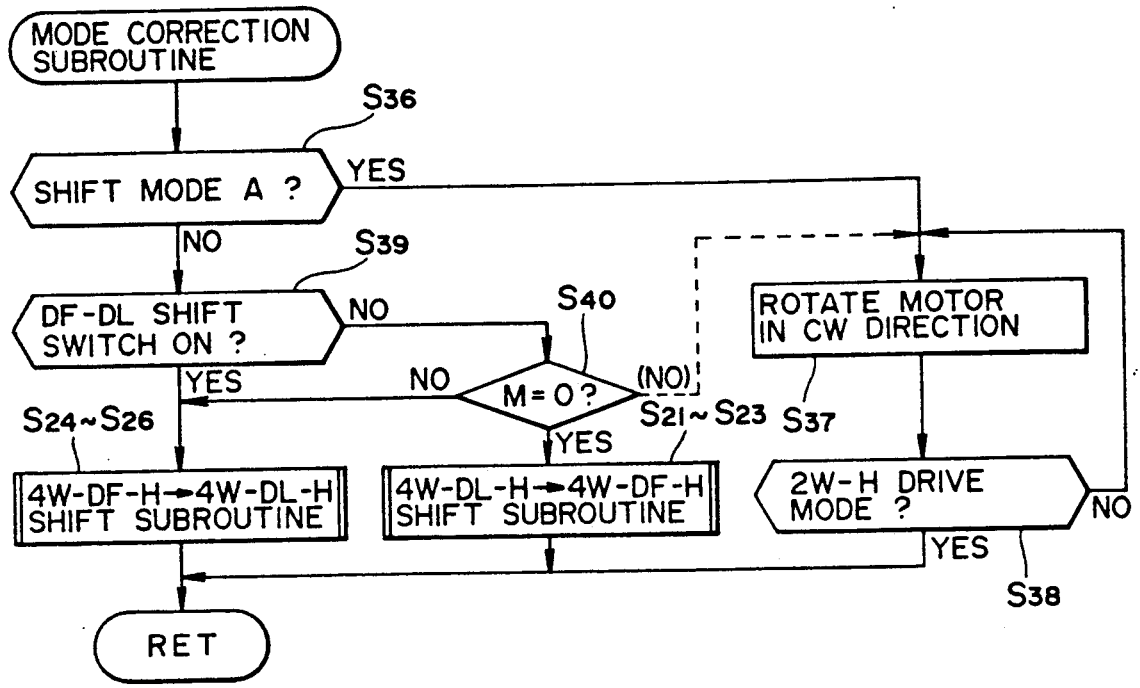
FIG. 9 is a flow chart showing a mode correction subroutine of control for the controller of the part-time four-wheel drive vehicle operating system.

Referring to FIG. 9, which is a flow chart of the mode correction subroutine, the first step S36 in FIG. 9 is to make a first decision: "is the transfer case ready for the shift mode A?" If the answer to the first decision is yes, the motor 81 is caused to rotate in the clockwise (CW) direction in step S37 so as to shift the transfer case T into the 2W-H drive mode. When the motor 81 is rotated, a second decision is made based on the drive mode signal provided by the mode sensor SW1 in step S38: "is the transfer case T shifted in 2W-H drive mode?" This second decision is repeated until the transfer case T is completely shifted into the 2W-H drive mode. If the answer to the second decision regarding of the transition of the transfer case T is yes, the final step orders return to the main routine.

If the answer to the first decision in step 36 regarding to the shift mode of the transfer case T is no, a third decision is made based on the operated condition of the drive mode selecting lever 65, namely the DF-DL shift switch, in step S39: "is the DL drive mode is selected?" If the answer is no, indicating that the DF drive mode is selected, then the state of malfunction flag is decided in step S40. The malfunction flag M has been set to M=1 indicating malfunction of the free-wheeling drive means 130 or M=0 indicating that the free wheeling drive means 130 or its some associated elements are disordered, this will be described in detail later in connection with FIG. 11. If the malfunction flag M=0 is detected, then the third drive mode shift subroutine of steps S21-S23 is called for. Otherwise, the no decision in step S40 or the yes decision in step S39, the fourth drive mode shift subroutine of steps S24-S26 is called for. These third and fourth drive mode shift subroutines will be described along with first, second and fifth drive mode shift subroutines in detail later.

Referring back to the main routine in FIG. 8, If the answer to the first decision in step S4 is no, a second decision in the main routine is made in step S5: "is the drive mode of the transfer case T in agreement with the state of the free-wheeling drive means 130?" If the answer to the third decision is no, a free-wheeling (F/W) mode correction subroutine is called for.

Figure 10:
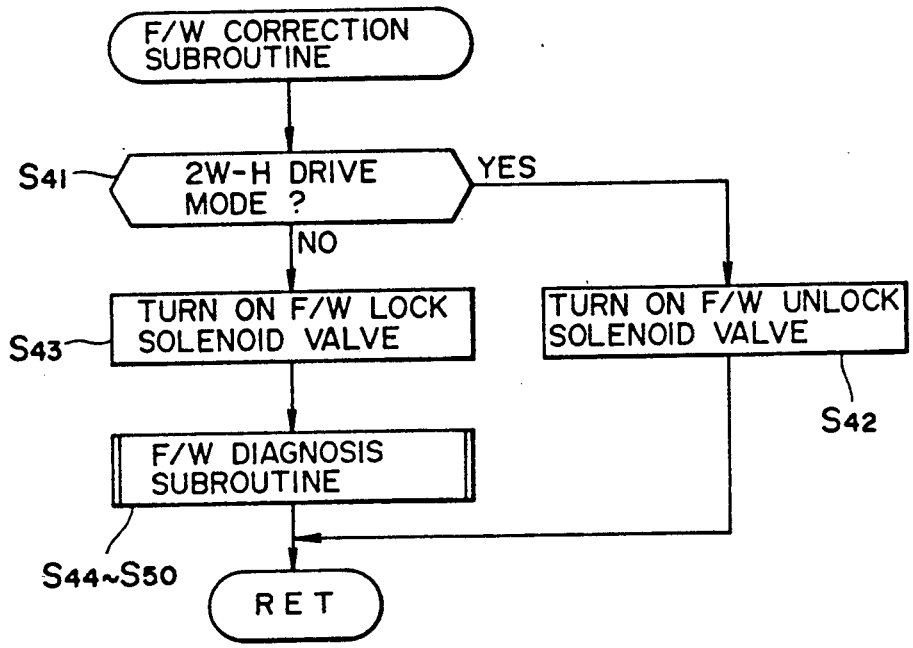
FIG. 10 is a flow chart showing a free-wheeling correction subroutine for the controller of the part-time four-wheel drive vehicle operating system of Figure.

Referring now to FIG. 10, which is a flow chart of the free-wheeling (F/W) mode correction subroutine, the first step S41 in FIG. 10 is to make a first decision: "is the transfer case T in the 2W-H drive mode?". If the answer to the first decision is yes, an actuation signal is applied to the first solenoid valve 131 to turn it on in step S42 so as to unlock or free the axle splitting means 20 of the free-wheeling drive means 130 in order to thereby shift it into its unlocked or free state. Thereafter, the step S42 orders return to the main routine. On the other hand, if the answer to the first decision is no, an actuation signal is applied to the second solenoid valve 132 to turn it on in step S43 so as to lock the free-wheel means 85 to thereby shift it into its locked state and, thereafter, a free-wheel drive mechanism (F/W) diagnosis subroutine of steps S44 to S50 is called for.

Figure 11:
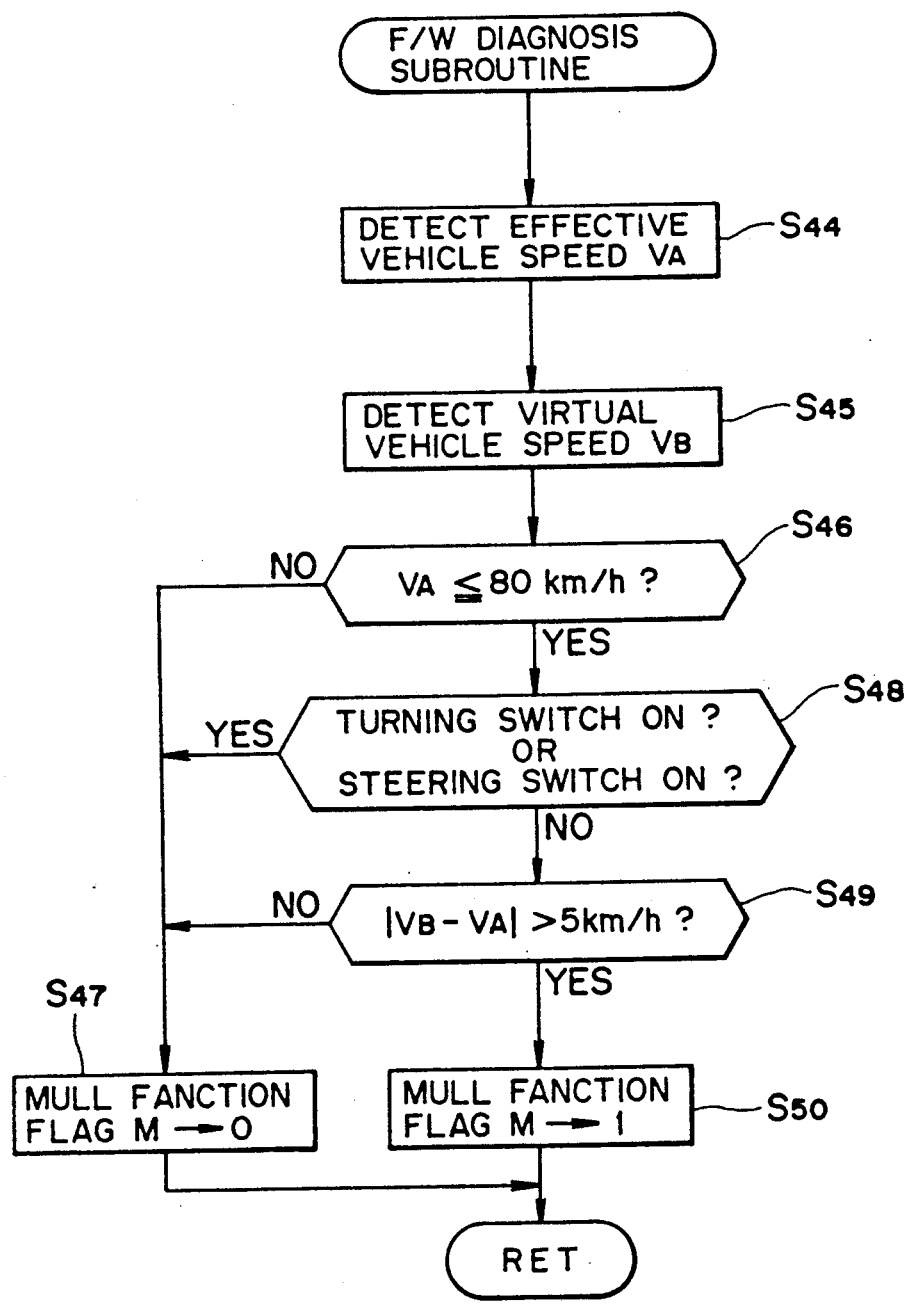
FIG. 11 is a flow chart showing a free-wheeling diagnosis subroutine for the controller of the part-time four-wheel drive vehicle operation system.

FIG. 11 is a flow chart of the F/W diagnosis subroutine. The first step in FIG. 11 is to read speeds of the wheels sensed through the wheel speed sensors 101 to determine the effective vehicle speed $V_A$ as an average speed of wheel speeds $V_{a1}$ to $V_{a4}$ of the four wheels 8F and 8R. Then, in step S45, a transmission output speed is read through the vehicle sensor 102 to determine the virtual vehicle speed, $V_B$. A first decision is made in step 46: "is the effective vehicle speed $V_A$ equal to or smaller than a predetermined critical speed?" In this embodiment, the critical speed is set to, for example, 80 km/h. If the answer to the first decision is no, the malfunction flag is set to M=0 which indicates the wrong connection of the free-wheeling drive means 130 and orders return to the main routine. Otherwise, the yes decision is made and a second decision is then made: "is at least one of the turning switch and the steering wheel switch turned on?" If the answer to the second decision is no, then the difference between the effective and virtual vehicle speeds is detected in order to determine the condition of the free-wheeling drive means 130. When the speed difference $|V_B - V_A|$ is larger than a predetermined constant speed, for example 5 km/h, the free-wheeling drive means 130 is presumed to have been connected. The predetermined constant speed may be set to 0 km/h or desirably between 5 and 10 km/h in consideration of measurment errors. When the free-wheeling drive means 130 is thus presumed, a step 50 orders return to the main routine after setting the malfunction flag to M=1. Otherwise, the yes decision in step 48 or no decision in step 49 indicates that the free-wheeling drive means 130 is presumed to have been disconnected and power escapes through the axle splitting means 120 of the free-wheeling drive means 130 while the center-differential is in the 4W drive mode of operation. Then step 47 orders return to the main routine after setting the malfunction flag to M=0.

Referring back again to FIG. 8, in step S6 in the main routine, the controller 100 causes the drive mode graphic display 91 to switch on or off the 4WD lamp 92A and the C/D lamp 93B in the patterns shown, for example, in the following table so as to display a present driving mode.

| Drive Mode | 4WD Lamp (92A) | C/D Lamp (93B) |
| --- | --- | --- |
| 2W-H | OFF | OFF |
| 4W-DL-H | ON | ON |
| 4W-DF-H | ON | OFF |

Step S7 following the indication of present drive mode is to read the conditions of the drive mode selecting lever 56 through the position sensor 62 to make a third decision in step S8 in the main routine: "is the drive mode selecting lever 56 correctly operated with respect to the present drive mode?" If the answer to the third decision is no, step S2 through S7 are repeated. On the other hand, if the answer to the third decision is yes, first through fifth drive mode shift subroutines are selectively called for according to operated states of the drive mode selecting lever 65.

Figure 12:
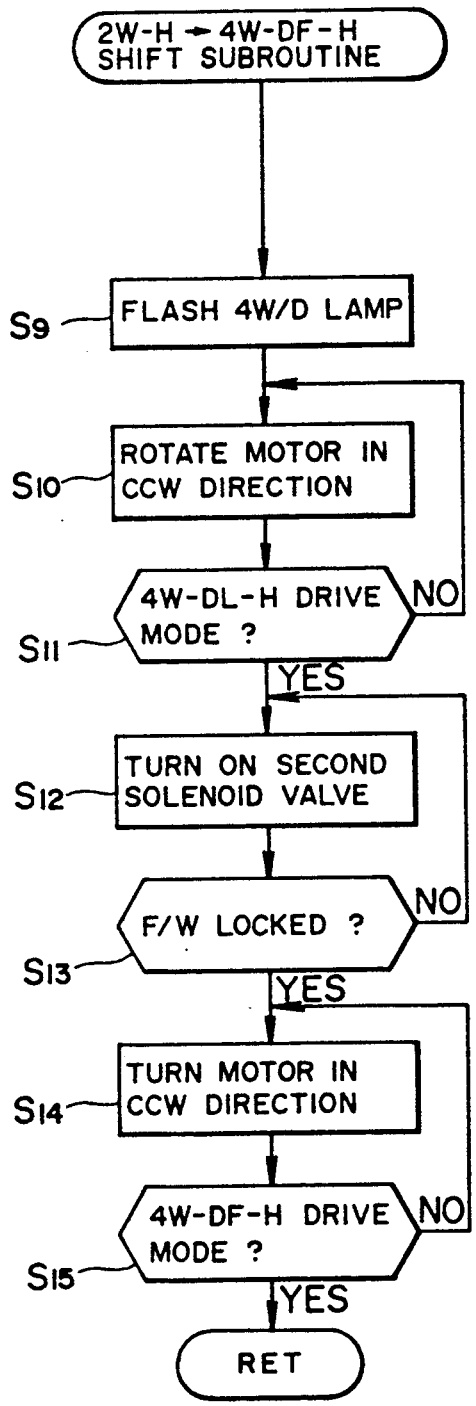
FIG. 12 is a flow chart showing a drive mode shifting subroutine for the part-time four-wheel drive vehicle operating system wherein the transfer case is shifted from a two-wheel high-speed drive mode into a four-wheel differential-free high-speed drive mode.

Referring now to FIG. 12, which is a flow chart of the first drive mode shift subroutine for shifting the transfer case T from the 2W-H to the 4W-DF-H drive mode, the first step S9 in FIG. 12 is to flash the 4WD lamp 92A for warning upon receiving an instruction signal provided by an operation of the drive mode selecting lever 65 in such a way that a turned-on time period is longer than a turned-off time period, thereby to indicate that the transfer case T is now being shifted into the 4W from the 2W drive mode. In step S10, the motor 81 is caused to rotate in the counterclockwise (CCW) direction to slide the second clutch sleeve 44 toward the position P$_{4L}$ from the position P$_2$. Then a first decision in this subroutine is made based on the drive mode signal provided by the mode sensor SW1 in step S11: "is the transfer case T shifted into 4W-DL-H drive mode?" If the answer to the first decision is no, steps S10 and 11 are repeated until the transfer case T is shifted in the 4W-DL-H drive mode. If the answer to the first decision is yes, indicating that the transfer case T is completed to shift into the 4W-DL-H drive mode, the controller 100 in step S12 provides an actuating signal which actuates the second solenoid valve 132 to connect the axle splitting means 120 of the free-wheeling drive means 130, locking the free-wheeling drive means 130. As the free-wheeling sensor SW2 detects the shift control rod 122 of the axle splitting means 120 at its connecting position to provide a signal, a second decision is made in step S13: "is the free-wheeling drive means 130 locked?". If the answer to the second decision is no, steps S12 and S13 are repeated until the lock sensor SW2 provides a lock signal, namely, the free-wheeling drive means 130 is completely locked. If the answer is yes, the motor 81, in step S15, is caused to rotate in the CCW direction to displace the second shift clutch 44 to the position P$_{4L}$ from the position P$_{4F}$ so as to shift the transfer case T into 4W-DF-H drive mode. In final step S15 in this subroutine, a third decision is made based on the mode signal provided by the mode sensor SW1: "has the transfer case T been shifted into the 4W-DF-H drive mode?" If the answer to the third decision is no, steps S14 and S15 are repeated until the transfer case T is shifted into the 4W-DF-H drive mode. On the other hand, if the answer to the third decision is yes, then the final step orders return to the main routine shown in FIG. 8.

Figure 13:
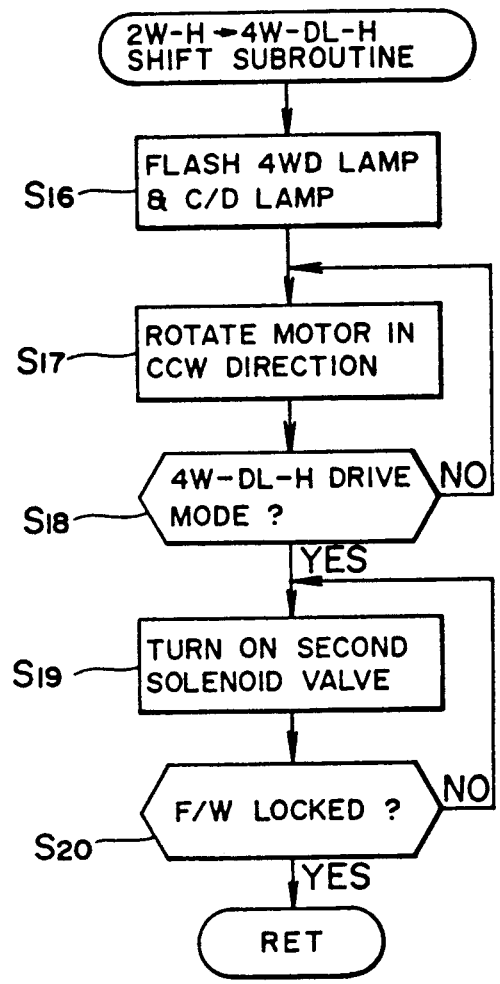
FIG. 13 is a flow chart showing a drive mode shifting subroutine for the part-time four-wheel drive vehicle operating system wherein the transfer case is shifted from the two-wheel high-speed drive mode into four-wheel differential-locked high-speed drive mode.

Referring now to FIG. 13, which is a flow chart of the second drive mode shift subroutine for shifting the transfer case T into the 4W-DL-H from 2W-H drive mode, the first step S16 in FIG. 13 is to read the conditions of the drive mode selecting lever 65 so as to flash the 4WD lamp 92A for warning and the C/D lamp 93B in the same way as in step S9 in the first drive mode shift subroutine. Taken following the first step S16 are steps S17 to S20 which have substantially the same operations or decisions as steps S10 to S13 in the first drive mode shift subroutine shown in FIG. 11. No repetition of description is needed here accordingly. If the answer to the second decision in the step S20 regarding whether the free-wheeling drive means 130 is locked is yes, then the final step orders return to the main routine shown in FIG. 8.

Figure 14:
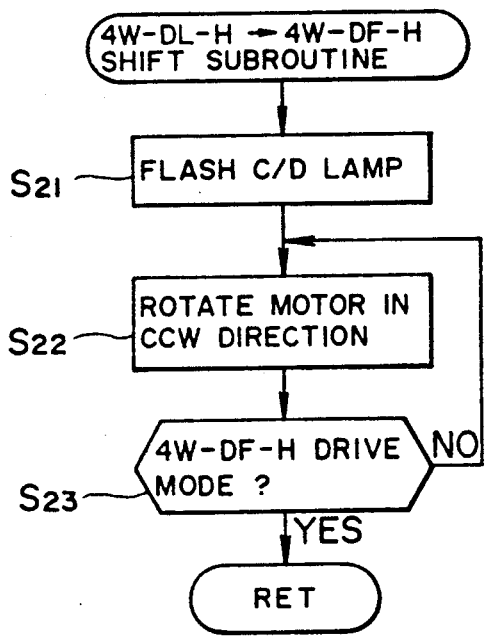
FIG. 14 is a flow chart showing a drive mode shifting subroutine for the part-time four-wheel drive vehicle operating system wherein the transfer case is shifted from the four-wheel differential-locked high-speed drive mode into the four-wheel differential-free high-speed drive mode.

FIG. 14 is a flow chart of the third drive mode shift subroutine for shifting the transfer case T into 4W-DF-H drive mode from the 4W-DL-H drive mode. The first step S21 in FIG. 14 is to read the condition of the drive mode selecting lever 65 so as to flash the C/D lamp 93B of the graphic display 91. Following the flash of the C/D lamp 93B, the motor 81 is caused to rotate in the CCW direction to displace the second shift clutch 44 so as to shift the transfer case T into the 4W-DF-H drive mode from the 4W-DL-H drive mode. At the final step S23 a first decision in the third drive mode shift subroutine is made based on the drive mode signal provided by the mode sensor SW1: "is the transfer case T shifted into the 4W-DF-H drive mode?" If the answer to the first decision is no, steps S22 and S23 are repeated until the transfer case T is completely shifted into the 4W-DF-H drive mode. If the answer is yes, then the final step orders return to the main routine shown in FIG. 8.

Figure 15:
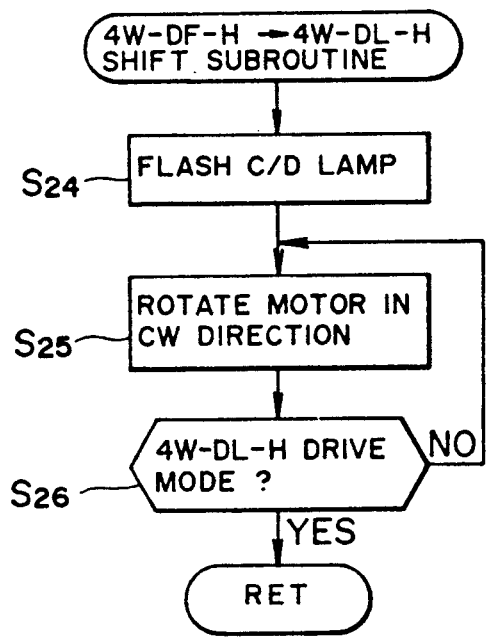
FIG. 15 is a flow chart showing a drive mode shifting subroutine for the part-time four-wheel drive vehicle operation system of FIG. 6 wherein the transfer case is shifted from the four-wheel differential-free high-speed drive mode into the four-wheel differential-locked high-speed drive mode.

Referring now to FIG. 15, which is a flow chart of the fourth drive mode shift subroutine for shifting the transfer case into the 4W-DL-H drive made from the 4W-DF-H drive mode. In this fourth drive mode shift subroutine, when the drive mode selecting lever 65 is operated from the position 4$_{HF}$ to the position P$_{4HL}$, a signal is provided to cause the C/D lamp 93B to flash in step S24. At a second step S25 following the flashing of the C/D lamp 93B, the motor 81 is caused to rotate in the CW direction so as to shift the transfer case T in the 4W-DL-H drive made. The final step S26 is to make a decision: "has the transfer case T been shifted into the 4W-DL-H drive mode?" This decision is made based on the drive mode signal provided by the mode sensor SW1. If the answer to the decision is no, indicating the transfer case T not yet completely shifted in the 4W-DL-H, steps S26 and S27 are repeated. If the answer to the first decision is yes, the final step S26 orders return to the main routine shown in FIG. 8.

Figure 16:
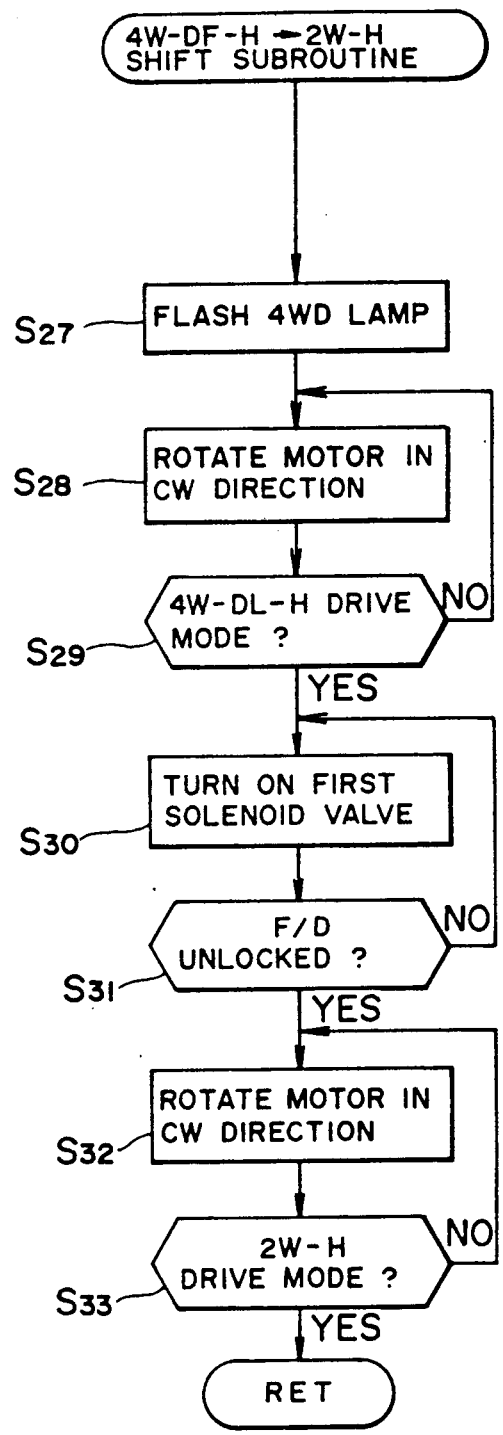
FIG. 16 is a flow chart showing a drive mode shifting subroutine for the part-time four-wheel drive vehicle operating system wherein the transfer case is shifted from the four-wheel differential-free high-speed drive mode into the two-wheel high-speed drive mode.

Finally, referring to FIG. 16, which is a flow chart of the fifth drive mode shift subroutine for shifting the transfer case T into the 2W-H drive mode from the 4W-DF-H drive mode, the first step S27 is to cause the 4WD lamp 92A of the graphic display 91 to flash. However, in this fifth drive mode shift subroutine, contrary to the first drive mode shift subroutine shown in FIG. 12, the 4W lamp 92A is lightened up for a time period shorter than the turned-on time period so as to indicate that the transfer case T is begun to be shifted into 2W-H drive mode. In step S28 following the flash of the 4W lamp 92A, the motor 81 is caused to rotate in the CW direction to return the transfer case T into the 4W-DL-H drive mode. When the motor 81 begins to rotate, a first decision in this fifth drive mode shift subroutine is made based on the drive mode signal provided by the mode sensor SW1 in step S29: "is the transfer case T shifted into 2W-DL-H drive mode?" If the answer to the first decision is no, steps S28 and S29 are repeated. On the other hand, if the answer to the first decision is yes, indicating that the transfer case T is shifted into the 2W-DL-H drive mode, he controller 100 provides a shift signal by which the first solenoid valve 131 is energized in step S30 to disconnect the split means 120 of the free-wheeling drive means 130 so as to unlock the free-wheeling drive means 130. If the free-wheeling drive means 130 is actually unlock as a result of second decision in step S31, the controller 100 rotates causes the motor 81 in the CW direction in step S32. Otherwise, the no decision is made, then the steps S30 and S31 are repeated. Finally, a third decision is made: "has the transfer case T been shifted into the 2W-H drive mode?" This decision is made based on the drive mode signal provided by the mode sensor SW1. The final step orders return to the step S32 if the answer is no or to the main routine shown in FIG. 8 if the answer is yes.

Referring back to FIG. 8, after the transfer-case T has been shifted into any one of the drive modes of operation according to operated states of the drive mode selecting lever 65, a final decision regarding the malfunction flag M is made in step S34. If the malfunction flag M=1 is decided, this indicates that the free-wheeling drive means 130 is presumed to have been disconnected or to have some trouble. Then the controller 100 causes the 4WD lamp 92A to flash for warning in step 35 and orders return to step S2. Otherwise the no decision indicates that the free-wheeling drive means 130 is connected, then orders return to step S2.

In the above described embodiment, if the free-wheeling drive means 130 is operationally wrong, namely the malfunction flag is set to M=1 in the F/W diagnosis subroutine, the controller 100 forces to shift the transfer case T into the 4W-DL-H drive mode of operation as is apparent in the mode correction subroutine shown in FIG. 9.

In the mode correction subroutine in FIg. 9, it is permissible to modify so that, if the malfunction flag has been set to M=1 in step 50 of the F/W diagnosis subroutine of FIG. 11, the controller 100 forces the transfer case T into the 2W-H drive mode of operation as is shown by a broken line.

Figure 17:
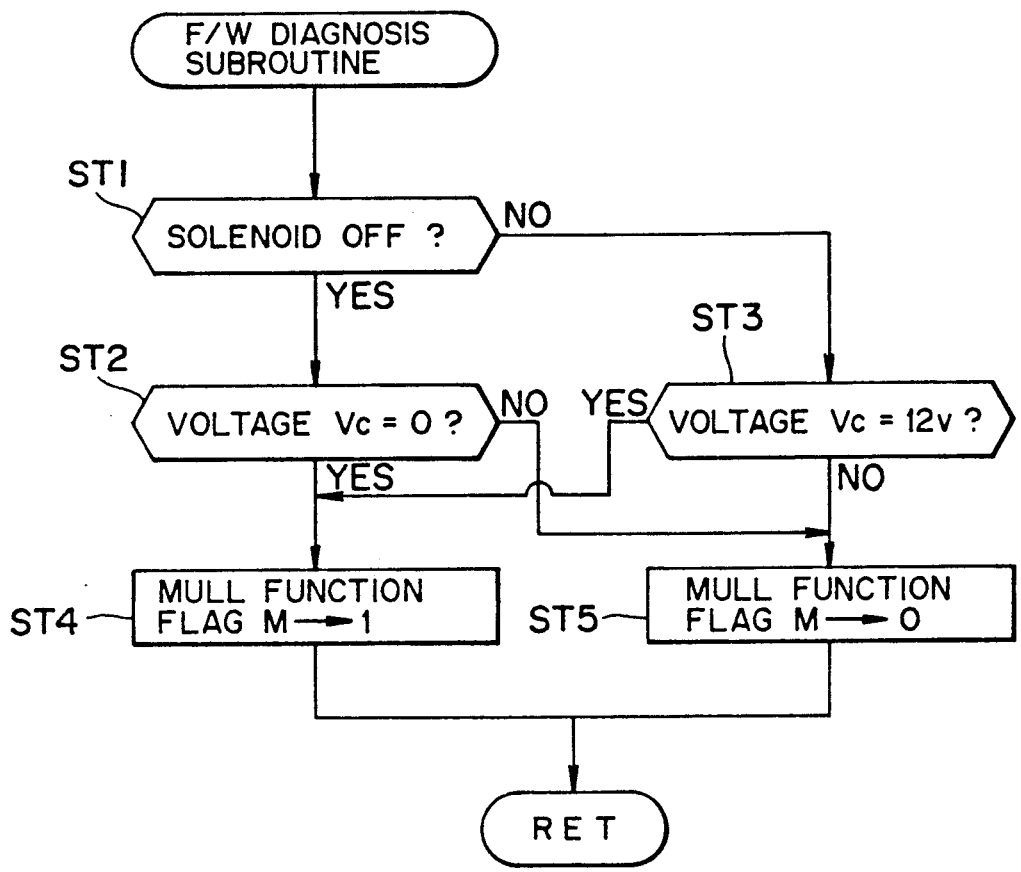
FIG. 17 is another embodiment of a flow chart showing a mode correction subroutine of control for the controller of the part-time four-wheel drive vehicle operating system.

It is otherwise possible to employ another F/W diagnosis subroutine shown in FIG. 17 in place of that shown in FIG. 11. This F/W diagnosis subroutine shown in FIG. 17 should be employed in connection with a circuit shown in FIG. 18. The first step ST1 is to make a decision to determine the condition of the solenoid valve. If the answer to the first decision is yes, namely the solenoid valve is off, a second decision is made in step ST2: "is the collector voltage $V_c$ of the transistor TR zero volt?" Otherwise, if the answer to the first decision is no, another decision is made in step ST3: "is the collector voltage $V_c$ 12 volts?" The yes decision in step ST2 or ST3 indicates that the solenoid valve or its associated electric element is regarded to be functionally broken, then the malfunction flag is set to M=1 in step ST4 or ST5 which orders return to the F/W correction subroutine shown in FIG. 9. Otherwise the no decision in step ST2 or ST3 indicates that the solenoid valve and its associated electric element function well, the final step ST5 sets the malfunction flag to M=0 and then orders return to the F/W correction subroutine shown in FIG. 9.

If the malfunction flag has been set not to M=0 but to M=1 in the F/W diagnosis subroutine shown in FIG. 17, the controller 100 causes the 4WD lamp 92A to flash in order to give the driver a warning and orders return to step S2 in the main routine shown in FIG. 8. In the mode correction subroutine in FIG. 9, if the malfunction flag has been set to M=1, step S40 orders to proceed to the 4W-DF-H to 4W-DL-H shift subroutine shown in FIG. 15 so as to shift the center-differential into the 4W-DL-H drive mode of operation. Alternatively, the center-differential of the transfer case T may be shifted into the 2W-H drive mode of operation as is shown by a broken line in FIG. 9 so as to shift the transfer case T into the 2W-H drive mode of operation.

Figure 18:
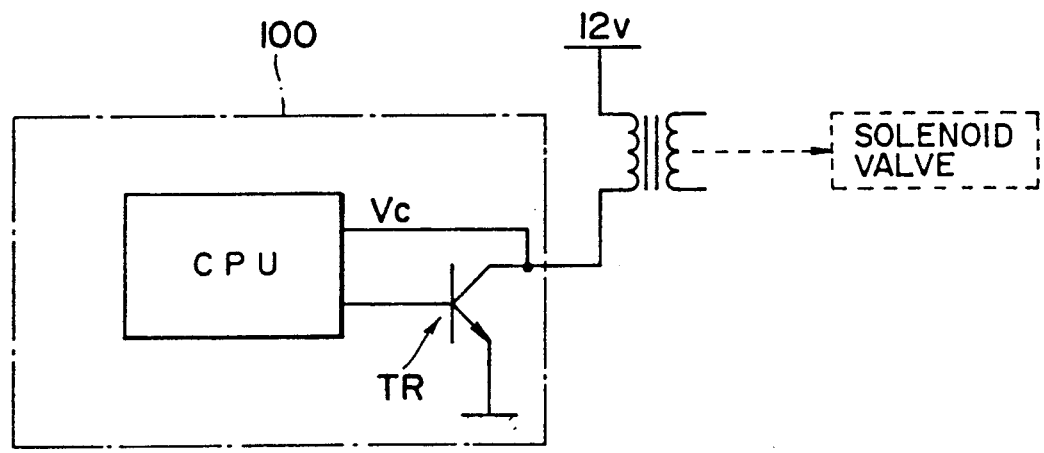
FIG. 18 is a block diagram showing means for detecting the disconnection of the free-wheeling means.

As apparent from the above description in connection with the embodiment shown in FIGS. 17 and 18, if the free-wheeling drive means 130 and/or its some associated elements are operationally disordered, namely the malfunction flag is set to M=1 in the F/W diagnosis subroutine, the controller 100 forces to shift the transfer case T into the 2W-H drive mode of operation as is apparent in the mode correction subroutine shown in FIG. 9.

Referring now to FIG. 19, which is a flow chart illustrating a routine for the controller 100 according to another preferred embodiment of the present invention. This routine should be employed in connection with the circuit shown in FIG. 18. The first step SU1 in FIG. 19 is to read whether an ignition switch of the vehicle is turned on or not. If the ignition switch is turned on, the first decision is made in Step SU2: "is the solenoid turned off?". Thereafter, a decision regarding the collector voltage $V_c$ of the transistor TR is made in Step SU6. If the collector voltage $V_c$ is zero, the controller 100 forces the transfer case T to shift into the 4W-DL-H drive mode of operation and prohibits it to shift into the 4W-DF-H drive mode of operation. Then the controller causes the 4WD lamp 92A to flash. If the answer to the decision in step SU6 regarding the collector voltage $V_c$ is no, the controller 100 forces the transfer case T to shift into the 4W-DF-H drive mode of operation.

On the other hand, if the answer to the decision in step SU2 is no indicating the solenoid is not turned off, another decision is made in step SU3; "is the solenoid turned on?" The yes answer to the decision in step SU3 calls for step SU4 wherein a decision regarding the predetermined collector voltage $V_c$ of, for example, 12v is made. If the answer to the decision in step SU4 is yes, the controller 100 takes steps SU8 and SU9 in order to shift the transfer case T into the 4W-DL-H drive mode of operation and to give a warning by flashing the 4W lamp 92A.

In the case of the no decision in step SU3 or SU4, the controller 100 takes step SU5 wherein the transfer case T is forced to shift into the 4W-DF-H drive mode of operation and goes to end.

It is to be noted that, the part-time four-wheel drive vehicle according to the preferred embodiments of the present invention has been described as being provided with a transfer case which is provided with a shift mechanism between high and low drive ranges, the provision of such a shift mechanism is not always necessary.

As is apparent from the above description, the condition of the free-wheeling drive means 130 is always monitored while the vehicle runs with the center-differential of the transfer case in the 4W-drive mode of operation and, if the free-wheeling drive means is disconnected, the center-differential of the transfer case is forced to shift into the differential locked drive mode of operation. Therefore, the transmission of drive power is secured to the wheels which are to be driven in the 2W drive mode of operation even when the free-wheeling drive means is accidentally disconnected due to operation errors. This leads to a sufficiently secured driving ability of the vehicle.

Although the present invention has beer fully described by way of the preferred embodiments thereof with reference to the accompanying drawings, it is to be noted that various changes and modifications are apparent to those skilled in the art. Therefore, unless otherwise such changes and modifications depart from the true scope of the present invention as claimed, they should be construed as included therein.

What is claimed is:

1. In a vehicle steered by a steering wheel and equipped with four-wheel drive having a transfer case including a center-differential which delivers driving power to both front and rear axle assemblies when needed, and is shiftable between a two-wheel and a four-wheel drive mode of operation and, in said four-wheel drive mode of operation, between a differential-locked and a differential-unlocked drive mode of operation, an axle differential disposed between left and right axles of at least one of said front and rear axle assemblies in association with wheels on said axles which are non-driven when said center-differential is in said two-wheel drive mode of operation, said one axle assembly being divided and delivering driving power differentially to said left and right axles thereof, and free-wheeling drive means with clutch means incorporated in said one axle assembly, said clutch means being disposed between said axle differential and one of said axles to operationally couple and uncouple said one axle from said axle differential, said free-wheeling drive means being actuated to force said clutch means to operationally disconnect said one axle from said axle differential so as to interrupt the transmission of driving power between said axle differential and said wheel secured to said one axle when said center-differential is in said two-wheel drive mode of operation, or to operationally connect said axle differential and said one axle so as to provide said transmission of driving power between said axle differential and said wheel on said one axle when said center-differential is in said four-wheel drive mode of operation, the improvement comprising:

detecting means for detecting whether said free-wheeling drive means is actuated to interrupt or provide said transmission of driving power; and control means coupled to said detecting means for forcing said center-differential to shift from said four-wheel differential-unlocked drive mode of operation to said two-wheel drive mode or said four-wheel differential-locked mode when said detecting means detects that said free-wheeling drive means is actuated to interrupt said transmission of driving power while said center-differential is in said four-wheel differential-unlocked drive mode of operation.

2. In a vehicle as defined in claim 1, wherein the forced shift of said center-differential is into said two-wheel drive mode of operation when the effective vehicle speed is less than about 80 km/h.

3. In a vehicle as defined in claim 1, wherein the forced shift of said center-differential is into said two-wheel drive mode of operation when the operated angle of the steering wheel is larger than a predetermined angle.

4. In a vehicle as defined in claim 1, wherein the forced shift of said center-differential is into said two-wheel drive mode of operation when a turn signal lamp switch is turned on.

5. In a vehicle as defined in claim 1, the further improvement of shifting means for shifting said center-differential back to said four-wheel differential-unlocked drive mode of operation responsive to said detecting means detecting connection of said free-wheeling drive means.

6. In a vehicle as defined in claim 1, wherein said center-differential is shifted back to said four-wheel drive mode of operation when said detecting means detects connection of said free-wheeling drive means during a shifting from said four-wheel differential-locked to said four-wheel differential-unlocked drive mode of operation.

7. In a vehicle as defined in claim 1, wherein said center-differential is shifted back to said four-wheel drive mode of operation when said detecting means detects connection of said four wheeling drive means during a shifting from said four-wheel differential unlocked to said four-wheel differential-locked drive mode of operation.

8. In a vehicle as defined in claim 1, wherein said detecting means includes means for detecting a malfunction in a circuit of a solenoid which actuates a solenoid valve for effecting connection and disconnection of said free-wheeling drive means.

9. In a vehicle as defined in claim 1, wherein said detecting means includes a switch turned on when said free-wheeling drive means is connected.

10. In a vehicle as defined in claim 1, wherein said detecting means includes a comparator for comparing an effective vehicle speed determined from the speeds of the vehicle wheels and a virtual vehicle speed determined from an output speed of the vehicle transmission.

11. In a vehicle as defined in claim 1, the further improvement of a warning lamp which flashes when said detecting means detects disconnection of said free-wheeling drive means while said vehicle is in said four-wheel differential-unlocked drive mode.

* * * * *